(12) United States Patent
Yamashita et al.

(10) Patent No.: US 9,273,875 B2
(45) Date of Patent: Mar. 1, 2016

(54) AIR CONDITIONING APPARATUS HAVING INDOOR, OUTDOOR, AND RELAY UNITS

(75) Inventors: Koji Yamashita, Tokyo (JP); Hiroyuki Morimoto, Tokyo (JP); Yuji Motomura, Tokyo (JP); Takeshi Hatomura, Tokyo (JP); Naoki Tanaka, Tokyo (JP); Shinichi Wakamoto, Tokyo (JP); Takashi Okazaki, Tokyo (JP); Yusuke Shimazu, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 476 days.

(21) Appl. No.: 13/056,164

(22) PCT Filed: Oct. 29, 2008

(86) PCT No.: PCT/JP2008/069600
§ 371 (c)(1),
(2), (4) Date: May 3, 2011

(87) PCT Pub. No.: WO2010/049999
PCT Pub. Date: May 6, 2010

(65) Prior Publication Data
US 2011/0197608 A1 Aug. 18, 2011

(51) Int. Cl.
*F25B 25/00* (2006.01)
*F24F 3/06* (2006.01)
(Continued)

(52) U.S. Cl.
CPC . *F24F 3/06* (2013.01); *F25B 13/00* (2013.01); *F25B 25/005* (2013.01);
(Continued)

(58) Field of Classification Search
CPC .................. F25B 25/005; F25B 2313/0231
USPC ............ 62/159, 179, 185, 201; 165/219–221, 165/202; 236/12.13
See application file for complete search history.

(56) References Cited

U.S. PATENT DOCUMENTS 6,405,551 B1 6/2002 Kuwabara et al.
7,669,647 B2 * 3/2010 Tsubone et al. .............. 165/202
(Continued)

FOREIGN PATENT DOCUMENTS

JP 58-153052 A 9/1983
JP 60-004832 U 1/1985
(Continued)

OTHER PUBLICATIONS

Office Action (Notification of Reasons for Refusal) dated Jul. 24, 2012, issued in corresponding Japanese Patent Application No. 2010-535542, and an English Translation thereof. (9 pages).
(Continued)

*Primary Examiner* — Jonathan Bradford
(74) *Attorney, Agent, or Firm* — Buchanan Ingersoll & Rooney PC

(57) ABSTRACT

A refrigeration cycle is configured by connecting a compressor that compresses the refrigerant, a four-way valve that switches the circulation path of the refrigerant, a heat source side heat exchanger that exchanges heat, expansion valves that adjust the pressure of the refrigerant, and two or more intermediate heat exchangers that exchange heat between the refrigerant and the heat medium to heat and cool the heat medium, by piping. A heat medium circulation circuit is configured by connecting two or more intermediate heat exchangers, pumps that pressurize the heat medium, two or more use side heat exchangers that exchange heat between the heat medium and the air in the indoor space, and flow path switching valves that switch paths of the heated heat medium or the cooled heat medium to the use side heat exchangers, by piping.

8 Claims, 11 Drawing Sheets

(51) Int. Cl.
  *F25B 13/00* (2006.01)
  *F24F 11/00* (2006.01)
(52) U.S. Cl.
  CPC  *F24F 2011/0043* (2013.01); *F24F 2011/0045* (2013.01); *F25B 2313/0231* (2013.01); *F25B 2313/0272* (2013.01); *F25B 2313/02741* (2013.01); *F25B 2600/13* (2013.01); *F25B 2700/13* (2013.01); *Y02B 30/745* (2013.01)

(56) References Cited

U.S. PATENT DOCUMENTS

| | | | |
|---|---|---|---|
| 2005/0039904 A1* | 2/2005 | Aler et al. | 165/219 |
| 2005/0155361 A1* | 7/2005 | Jung et al. | 62/159 |
| 2006/0191286 A1 | 8/2006 | Park et al. | |

FOREIGN PATENT DOCUMENTS

| | | | | |
|---|---|---|---|---|
| JP | 2-219940 A | 9/1990 | | |
| JP | 05-280818 | * 10/1993 | | F25B 13/00 |
| JP | 5-280818 A | 10/1993 | | |
| JP | 07-083466 A | 3/1995 | | |
| JP | 10-089709 A | 4/1998 | | |
| JP | 2002-228167 A | 8/2002 | | |
| JP | 2003-343936 A | 12/2003 | | |
| JP | 2004-069134 A | 3/2004 | | |
| JP | 2005-308314 A | 11/2005 | | |
| JP | 2005-351587 A | 12/2005 | | |
| JP | 2006-003079 A | 1/2006 | | |
| JP | 2007-255851 A | 10/2007 | | |
| JP | 2008-134045 A | 6/2008 | | |

OTHER PUBLICATIONS

International Search Report (PCT/ISA/210) issued on Jan. 20, 2009, by Japanese Patent Office as the International Searching Authority for International Application No. PCT/JP2008/069600.

First Office Action issued on Nov. 1, 2012 by the Chinese Patent Office in in corresponding Chinese Patent Application No. 200880130556.5, and an English translation thereof.

Extended European Search Report dated Aug. 5, 2014, issued in corresponding European Patent Application No. 08 87 7711.

* cited by examiner

AIR CONDITIONING APPARATUS HAVING INDOOR, OUTDOOR, AND RELAY UNITS

TECHNICAL FIELD

The present invention relates to an air-conditioning apparatus such as a multiple-air-conditioner for buildings.

BACKGROUND ART

In an air-conditioning apparatus such as a multi-air-conditioning apparatus for buildings, a refrigerant is made to circulate between, for example, an outdoor unit, which is a heat source apparatus, disposed outside a building and an indoor unit disposed inside of the building. Through the release or absorption of heat by the refrigerant, the heated or cooled air has performed cooling or heating of the space subjected to air-conditioning. As for the refrigerant, HFC (hydrofluorocarbon) refrigerant is often used, for example. Alternatively, a natural refrigerant such as carbon dioxide ($CO_2$) is proposed, as well.

In an air-conditioning apparatus called a chiller, cooling energy or heating energy is generated in the heat source apparatus disposed outside the building. Then, water and anti-freezing liquid or the like is heated or cooled by a heat exchanger disposed in an outdoor unit and by carrying it to an indoor unit such as a fan coil unit and panel heater, so that cooling or heating has been performed. Some heat source apparatus called a waste heat recovery type chiller is connected with four water pipelines to supply cooled or heated water or the like simultaneously. (Refer to Patent Literature 1, for example)

Patent Literature 1 JP-2003-343936A

SUMMARY OF INVENTION

Technical Problem

In the conventional air-conditioning apparatus, since the refrigerant is made to circulate into the indoor unit, the refrigerant may be leaked indoors. On the other hand, in an air-conditioning apparatus like the chiller, no refrigerant passes through the indoor unit. However, it is necessary to heat or cool water, anti-freezing liquid and the like in the heat source apparatus outside the building to carry it into the indoor unit side. Therefore, a circulation path of water, anti-freezing liquid and the like becomes longer. Here, when trying to carry heat that performs works of predetermined heating or cooling by the water, anti-freezing liquid and the like, energy consumption by carrying power and the like becomes larger than the refrigerant. Accordingly, a long circulation path results in extremely large carrying power. Hence, in the air-conditioning apparatus, for example, energy saving can be achieved if the circulation of water, anti-freezing liquid and the like is successfully controlled.

The present invention is made to solve the above problems and its object is to provide an air-conditioning apparatus that allows no refrigerant to circulate into the indoor unit and can achieve energy-saving.

The air-conditioning apparatus according to the present invention includes: a refrigeration cycle that connects a compressor to compress the refrigerant, refrigerant flow path switching apparatus to switch the circulation path of the refrigerant, a heat source side heat exchanger to make the refrigerant exchange heat, a throttle device to adjust the pressure of the refrigerant, and two or more intermediate heat exchangers that exchange heat between the refrigerant and a heat medium different from the refrigerant, by piping; and a heat medium circulation circuit that connects a pump to make the heat medium related to the heat exchange in each of two or more heat exchangers, a use side heat exchanger that exchanges heat between the heat medium and the air related to the space subjected to air-conditioning, and a flow path switching valve that switches pass of the heated heat medium or the cooled heat medium for the use side heat exchanger, by piping. The heat source side heat exchanger, the intermediate heat exchangers, and the use side heat exchangers are separately formed respectively and adapted to be disposed at separate locations from each other.

Advantageous Effects of Invention

According to the present invention, in the indoor unit for heating or cooling the air subjected to air-conditioning, the heat medium circulates and no refrigerant circulates. Therefore, even if the refrigerant leaks into the space subjected to air-conditioning, for example, ingress of the refrigerant to indoors can be suppressed, resulting in a safe air-conditioning apparatus. Piping where the medium circulates can be made shorter than the air-conditioning apparatus like a chiller, the carrying power can be small. Accordingly, energy-saving can be achieved.

BRIEF DESCRIPTION OF DRAWINGS

FIG. 1 is a diagram showing an example of installation of an air-conditioning apparatus according to an embodiment of the present invention.
FIG. 2 is diagram showing another example of installation of an air-conditioning apparatus.
FIG. 3 is a diagram illustrating the configuration of an air-conditioning apparatus according to Embodiment 1.
FIG. 4 is a diagram showing a refrigerant and a heat medium flows at the time of cooling only operation.
FIG. 5 is a diagram showing processing related to adjustment of the flow amount adjustment valve 25.
FIG. 6 is a diagram showing the refrigerant and the heat medium flow at the time of heating only operation.
FIG. 7 is a diagram showing the refrigerant and the heat medium flow at the time of cooling-main operation.
FIG. 8 is a diagram showing the refrigerant and the heat medium flow at the time of heating-main operation.
FIG. 9 is a diagram showing processing related to the control of the rotation speed of the pumps 21*a* and 21*b*.
FIG. 10 is a diagram showing the configuration of the air-conditioning apparatus according to Embodiment 2.
FIG. 11 is a diagram showing the configuration of the air-conditioning apparatus according to Embodiment 4.
FIG. 12 is a diagram showing the configuration of the air-conditioning apparatus according to Embodiment 5.

REFERENCE SIGNS LIST

Figure 1:
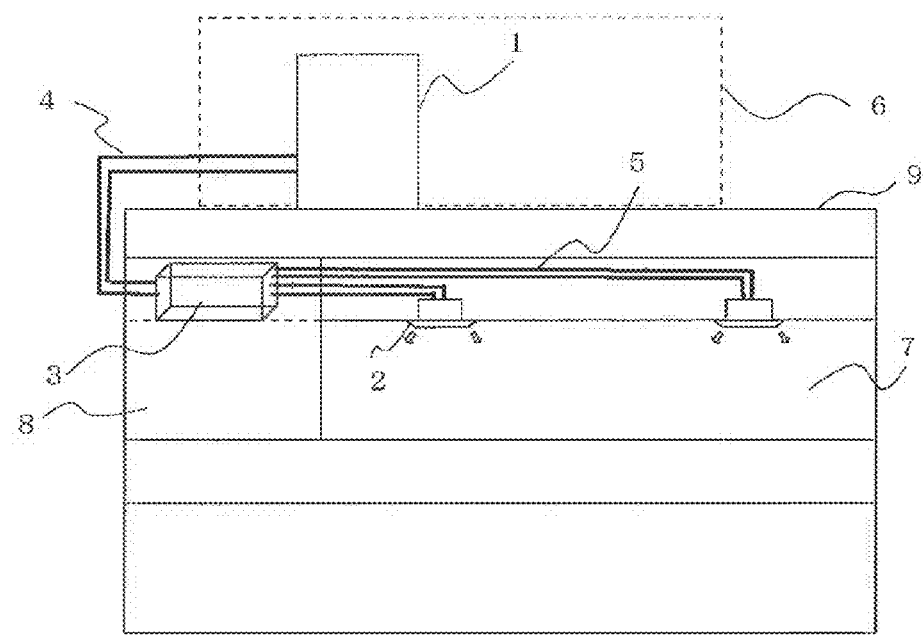
[FIG. 1]

1 heat source apparatus (outdoor unit)
2, 2*a*, 2*b*, 2*c*, 2*d* indoor unit 3 relay unit
3a main relay unit
3b(1), 3b(2) sub relay unit
4 refrigerant pipeline
5, 5a, 5b, 5c, 5d heat medium pipeline
6 outdoor space
7 indoor space
8 non-air conditioned space
9 building
10 compressor
11 four-way valve
12 heat source side heat exchanger
13a, 13b, 13c, 13d check valve
14 gas-liquid separator
15a, 15b intermediate heat exchanger
16a, 16b, 16c, 16d, 16e expansion valve
17 accumulator
21a, 21b, pump (heat medium feeding-out apparatus)
22a, 22b, 22c, 22d flow path switching valve
23a, 23b, 23c, 23d flow path switching valve
24a, 24b, 24c, 24d stop valve
25a, 25b, 25c, 25d flow amount adjustment valve
26a, 26b, 26c, 26d use side heat exchanger
31a, 31b first temperature sensor
32a, 32b second temperature sensor
33a, 33b, 33c, 33d third temperature sensor
34a, 34b, 34c, 34d fourth temperature sensor
35 fifth temperature sensor
36 pressure sensor
37 sixth temperature sensor
38 seventh temperature sensor
41a, 41b, 41c, 41d flow amount meter
100 outdoor unit side controller
200 signal line
300 relay unit side controller
301 heat medium flow amount controller
302 heat medium feeding-out controller

DESCRIPTION OF EMBODIMENTS

Embodiment 1

FIG. 1 is a diagram showing an example of installation of an air-conditioning apparatus according to an embodiment of the present invention. The air-conditioning apparatus of FIG. 1 includes an outdoor unit 1, which is a heat source apparatus, one or a plurality of indoor units 2 that perform air-conditioning of the space to be air-conditioned, and a relay unit 3 that exchanges heat between the refrigerant and a medium (hereinafter, referred to as a heat medium) which is different from the refrigerant and carries heat to relay heat transmission, as separate units, respectively. The outdoor unit 1 and the relay unit 3 are connected by refrigerant pipeline 4 so as to allow a refrigerant such as a pseudo-azeotropic mixture refrigerant, for example, R-410A and R-404A to circulate and to transfer heat. On the other hand, the relay unit 3 and the indoor unit 2 are connected by heat medium pipeline 5 so as to allow the heat medium such as plain water, water to which a non-volatile or low-volatile preservatives within air-conditioning temperature range, and anti-freezing liquid is added, to circulate in order to transfer heat.

Here, in the present embodiment, the outdoor unit 1 is installed in the outdoor space 6, which is a space outside the buildings 9. The indoor unit is installed at a location where the air in the indoor space 7, which is a space to be air-conditioned such as a living room in the buildings 9, can be heated or cooled. The relay unit 3 where the refrigerant flows in and flows out is installed in a non-air conditioning space 8 inside the building which is different from the outdoor space 6 and the indoor space 7. In order to avoid bad influences (such as a sense of discomfort) of the refrigerant on humans caused by the occurrence of refrigerant leakage and so on, the non-air conditioned space 8 is made to be a space having no or few visitors. In FIG. 1, the non-air conditioned space 8 such as a ceiling space under the roof partitioned by walls from the indoor space 7 in the relay unit 3 is installed. The relay unit 3 may be installed in, for example, a common use space where an elevator is installed as the non-air conditioned space 8.

It is configured that the outdoor unit 1 and the relay unit 3 of the present embodiment can be connected using two refrigerant pipelines 4. The relay unit 3 and each indoor unit 2 can be connected using two heat medium pipelines 5 respectively. Such connection configuration allows two refrigerant pipelines 4 to pass through a wall of the building 9, facilitating the construction of the air-conditioning apparatus to the buildings 9.

Figure 2:
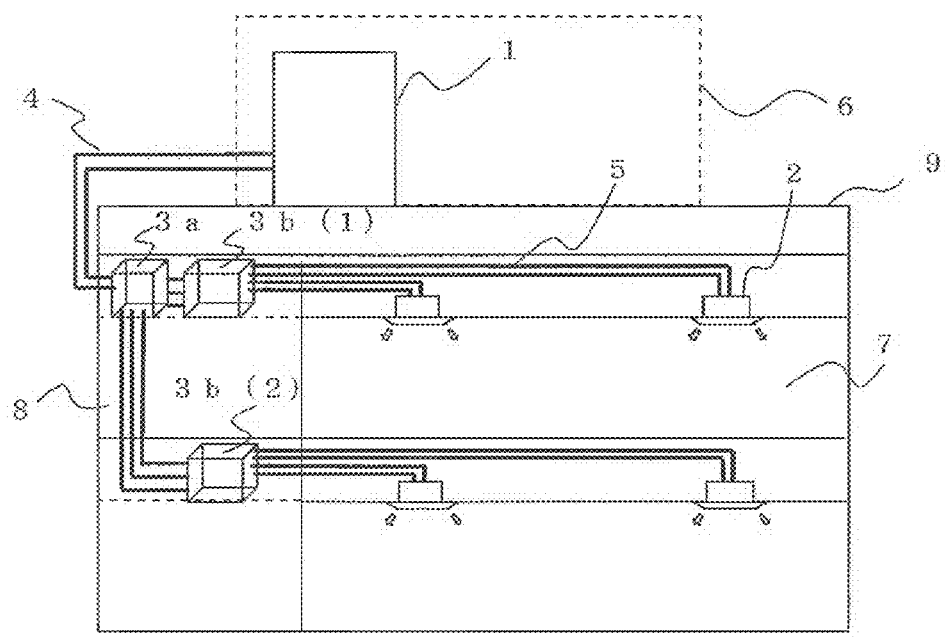
[FIG. 2]

FIG. 2 is a diagram showing another example of installation of the air-conditioning apparatus. In FIG. 2, the relay unit 3 is divided into a main relay unit 3a and a plurality of sub relay units 3b(1) and 3b(2). Although details of the configuration will be mentioned later, by dividing the relay unit 3 into the main relay unit 3a and the sub relay units 3b, a plurality of sub relay units 3b can be connected with one main relay unit 3a. In the configuration of the present embodiment, there are three connection-pipelines connecting between the main relay unit 3a and each sub relay unit 3b.

Here, examples are shown in FIGS. 1 and 2 in which the indoor unit 2 is made to be a ceiling cassette type. However, it is not limited thereto. For example, any type such as a ceiling-concealed type and a ceiling-suspended type will be allowable as long as heated or cooled air can he supplied into the indoor space 7 directly or through a duct.

Although the outdoor unit 1 is explained with the case of being installed in the outdoor space 6 outside the building 9 as an example, it is not limited thereto. For example, the heat source apparatus 1 may be installed in a surrounded space like a machine room with a ventilating opening. The outdoor unit 1 may be installed inside the building 9 and air may be discharge exhausted heat to outside of the building 9 through an exhaust duct. Alternatively, using a water-cooled type heat source apparatus, the outdoor unit 1 may be installed inside the building 9.

The relay unit 3 may be disposed near the outdoor unit 1, which may be against energy-saving.

Figure 3:
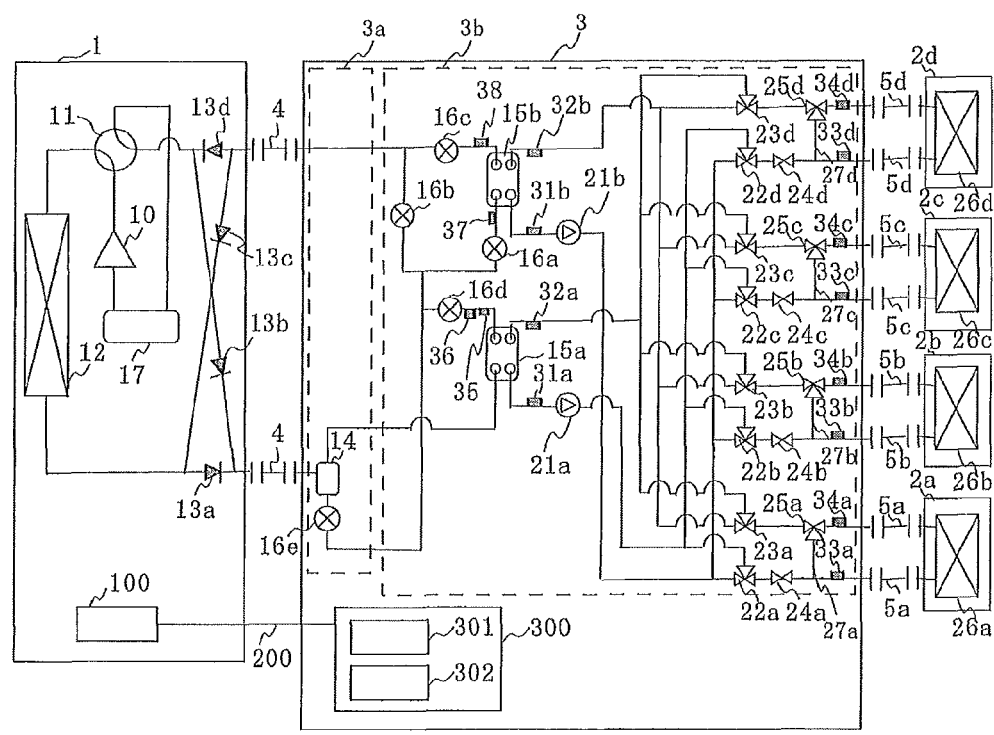
[FIG. 3]

FIG. 3 is a diagram illustrating the configuration of an air-conditioning apparatus according to Embodiment 1. The air-conditioning apparatus of the present embodiment has a refrigeration cycle apparatus configuring a refrigeration cycle (a refrigerant circulation circuit, a primary side circuit) connecting, by piping, a compressor 10, a four-way valve 11, a heat source side heat exchanger 12, check valves 13a, 13b, 13c, and 13d, a gas-liquid separator 14, an intermediate heat exchangers 15a and 15b, expansion valves 16a, 16b, 16c, 16d, and 16e, and an accumulator 17.

The compressor 10 compresses the sucked refrigerant to discharge (send out) it. The four-way valve 11, which is a refrigerant flow path switching apparatus, switches valves corresponding to an operation form (mode) related to cooling and heating on instructions of the outdoor unit side controller 100 to switch the refrigerant flow path. In the present embodiment, the circulation path is made to be switched according to the time of cooling only operation (operation in which all operating indoor units 2 perform cooling (including dehumidifying, hereinafter the same)) and cooling-main operation (operation in which cooling becomes dominant when there are concurrently indoor units 2 that perform cooling and heating operation respectively), and the time of heating only operation (operation in which all operating indoor units 2 perform heating) and heating-main operation (operation in which heating becomes dominant when there are concurrently indoor units 2 that perform cooling and heating operation respectively).

The heat source side heat exchanger 12 has a heat-transfer tube to feed the refrigerant and fins (not shown) to enlarge a heat-transfer area between the refrigerant flowing in the heat-transfer tube and the outside air to exchange heat between the refrigerant and the air (outside air). For example, in heating only operation and heating-main operation, the heat source side heat exchanger 12 functions as an evaporator to evaporate and gasify (vaporize) the refrigerant. On the other hand, in cooling only operation and cooling-main operation, the heat source side heat exchanger 12 functions as a condenser or gas cooler (hereinafter, a condenser). Then, in some cases, the refrigerant is not completely gasified or liquefied but made to be a two-phase mixture (gas-liquid two-phase refrigerant) state of the liquid and gas.

Check valves 13a 13b, 13c, and 13d prevent the refrigerant from flowing back to adjust the refrigerant flow and to keep a circulation path of the refrigerant flows into and out of the outdoor unit 1 constant. The gas-liquid separator 14 separates the refrigerant flowing from the refrigerant pipeline 4 into a gasified refrigerant (gas refrigerant) and a liquefied refrigerant (liquid refrigerant). The intermediate heat exchangers 15a and 15b have a heat-transfer tube for feeding the refrigerant and another heat-transfer tube for feeding the heat medium to exchange heat between media by the refrigerant and the heat medium. In the present embodiment, the intermediate heat exchanger 15a functions as a condenser or a gas cooler in heating only operation, cooling-main operation, and heating-main operation to make the refrigerant release heat to heat the heat medium. The intermediate heat exchanger 15b functions as an evaporator in cooling only operation, cooling-main operation, and heating-main operation to make the refrigerant absorb heat to cool the heat medium. For example, expansion valves 16a, 16b, 16c, 16d, and 16e such as an electronic expansion valves functioning as throttle devices decompress the refrigerant by adjusting the refrigerant flow amount. The accumulator 17 has a function to store a surplus refrigerant in the refrigeration cycle and to prevent the compressor 10 from being damaged by a great amount of the refrigerant liquid returning to the compressor 10.

In FIG. 3, the air-conditioning apparatus has a heat medium side apparatus in which the above-mentioned intermediate heat exchangers 15a and 15b, pumps 21a and 21b, flow path switching valves 22a, 22b, 22c, 22d, 23a, 23b, 23c, and 23d, stop valves 24a, 24b, 24c, and 24d, flow amount adjustment valves 25a, 25b, 25c, and 25d, use side heat exchangers 26a, 26b, 26c, and 26d, and heat medium bypass pipelines 27a, 27b, 27c, and 27d are connected with piping to configure a heat medium circulation circuit (a secondary side circuit).

The pumps 21a and 21b, which are heat medium feeding-out apparatus, pressurize the heat medium to circulate. Here, regarding the pumps 21a and 21b, it is possible to change a flow amount (discharge flow amount) of the heat medium to be fed out by changing the rotation speed of the built-in motor (not shown) within a certain range. The use side heat exchangers 26a, 26b, 26c, and 26d exchange heat between the heat medium and the air to be supplied into the indoor space 7 to heat or cool the air in the indoor space 7 and the air to be fed into the indoor space 7 in indoor units 2a, 2b, 2c, and 2d, respectively. The flow path switching valves 22a, 22b, 22c, and 22d, which are three-way switching valves or the like,
switch a flow path at the inlet side (heat medium flow-in side) of the use side heat exchangers 26a, 26b, 26c, and 26d, respectively. The flow path switching valves 23a, 23b, 23c, and 23d switch flow paths at the outlet side (heat medium flow-out side) of the use side heat exchangers 26a, 26b, 26c, and 26d, respectively as well. Here, these switching apparatuses perform switching in order to let either the heated heat medium or the cooled heat medium pass through the use side heat exchangers 26a, 26b, 26c, and 26d. The stop valves 24a, 24b, 24c, and 24d are opened/closed based on the instructions from the relay unit side controller 300 in order to make the heat medium pass through or be shut off from the use side heat exchangers 26a, 26b, 26c, and 26d.

Flow amount adjustment valves 25a, 25b, 25c, and 25d, which are three-way flow amount adjustment valves, adjust ratio of the heat medium passing through the use side heat exchangers 26a, 26b, 26c, and 26d and heat medium bypass pipelines 27a, 27b, 27c, and 27d based on the instructions from the relay unit side controller 300 respectively. Heat medium bypass pipelines 27a, 27b, 27c, and 27d allow the heat medium that has not flowed through the use side heat exchangers 26a, 26b, 26c, and 26d by adjusting the flow amount adjustment valves 25a, 25b, 25c, and 25d to pass through.

First temperature sensors 31a and 31b are temperature sensors to detect the temperature of the heat medium at the heat medium outlet side (heat medium flow-out side) of the intermediate heat exchangers 15a and 15b, respectively. Second temperature sensors 32a and 32b are temperature sensors to detect the temperature of the heat medium at the heat medium inlet side (heat medium flow-in side) of the intermediate heat exchangers 15a and 15b, respectively. Third temperature sensors 33a, 33b, 33c, and 33d are temperature sensors to detect the temperature of the heat medium at inlet, side (flow-in side) of the use side heat exchangers 26a, 26b, 26c, and 26d. Fourth temperature sensors 34a, 34b, 34c, and 34d are temperature sensors to detect the temperature of the heat medium at the cutlet side (flow-out side) of the use side heat exchangers 26a, 26b, 26c, and 26d, respectively. Hereinafter, for example, as to the same means such as the fourth temperature sensors 34a, 34b, 34c, and 34d, subscripts will be omitted or the notation will be the fourth temperature sensors 34a to 34d when they need not to be distinguished in particular. Other apparatuses and means will be the same.

Fifth temperature sensor 35 is a temperature sensor to detect the refrigerant temperature at the refrigerant outlet side (refrigerant flow-out side) of the Intermediate heat exchanger 15a. The pressure sensor 36a is a pressure sensor to detect the refrigerant pressure at the refrigerant outlet side (refrigerant flow-out side) of the intermediate heat exchanger 15a. The sixth temperature sensor 37 is a temperature sensor to detect the refrigerant temperature at the refrigerant inlet side (refrigerant flow-in side) of the intermediate heat exchanger 15b. Seventh temperature sensor 38 is temperature sensor to detect the refrigerant temperature at the refrigerant outlet side (refrigerant flow-out side) of the intermediate heat exchanger 15b. From the above-mentioned temperature detection means and pressure detection means, signals related to temperature and pressure related to detection are transmitted to the relay unit side controller 300.

In the present embodiment, at least the outdoor unit 1 and the relay unit 3 include the outdoor unit side controller 100 and the relay unit controller 300, respectively. The outdoor unit side controller 100 and the relay unit side controller 300 are connected by communication lines 200 to perform signal communication including various data. Here, the communication lines 200 may be wireless. The outdoor unit side controller 100 performs processing to perform control such as to transmit signals related to the command to each apparatus accommodated especially in the outdoor unit 1 of the refrigeration cycle apparatus. Therefore, a storage device (not shown) is provided that stores various data and programs necessary for processing data for detecting various detection means temporarily or for a long time. In the present embodiment, data of control target values which are standards to control the condensing temperature and the evaporating temperature in the refrigeration apparatus are stored. The relay unit controller 300 performs processing to perform control such as transmission of signals related to the command to each apparatus accommodated in the relay unit 3 such as apparatuses of the heat medium circulation circuit. Here, control target values or adjustment values (differences from the control target values) of the control target values are determined and signals including the data are transmitted to the outdoor side controller 100. The relay unit side controller 300 is supposed to have a storage device (not shown) as well. In the present embodiment, there is supposedly provided heat medium flow amount control means 301 that performs processing to make flow amount control valves 25a to 25d to adjust the flow amount of the heat medium passing through the use side heat exchanger 26a to 26d. Also, there is supposedly provided heat medium feeding-out control means 302 for controlling the flow amount of the heat medium fed out by pumps 21a and 21b, based on the rotation speed of the pumps 21a and 21b. Here, in the present embodiment, although the outdoor unit side controller 100 and the relay unit side controller 300 are adapted to be installed inside the outdoor unit 1 and the relay unit 3 respectively, the installation place is not limited, such as being installed nearby as long as each apparatus can be controlled.

In the present embodiment, the compressor 10, the four-way valve 11, the heat source side heat exchanger 12, the check valves 13a to 13d, the accumulator 17, and the indoor unit side controller 100 are accommodated in the outside unit 1. The use side heat exchangers 26a to 26d are accommodated in indoor unit 2a to 2d, respectively.

In the present embodiment, among each device related to the heat medium circulation circuit and the refrigeration cycle apparatus, the gas-liquid separator 14 and the expansion valves 16a to 16e are accommodated in the relay unit 3. The first temperature sensors 31a and 31b, the second temperature sensors 32a and 32b, the third temperature sensors 33a to 33d, the fourth temperature sensors 34a to 34d, the fifth temperature sensor 35, the pressure sensor 36, the sixth temperature sensor 37, and the seventh temperature sensor 38 are accommodated in the relay unit 3, too.

Here, in a case where the main relay unit 3a and one or a plurality of the sub relay units 3b are installed separately as shown in FIG. 2, the gas-liquid separator 14 and the expansion valves 16e are accommodated in the main relay unit 3a as shown by the dotted line in FIG. 3, for example. The intermediate heat exchangers 15a and 15b, the expansion valves 16a to 16d, the pumps 21a and 21b, the flow path switching valves 22a to 22d and 23a to 23d, the stop valves 24a to 24d, and the flow amount adjustment valves 25a to 25d are accommodated in the relay unit 3b.

Next, descriptions will be given to the operation of the air-conditioning apparatus in each operation mode based on the refrigerant and heat medium flow. Here, the pressure in the refrigeration cycle and the like is not determined by the relation to the standard pressure but represented by high or low pressure as a relative pressure generated by the compression of the compressor 1 and the refrigerant flow amount control of the expansion valves 16a to 16e. It is assumed to be the same for the temperature.

Cooling Only Operation

Figure 4:
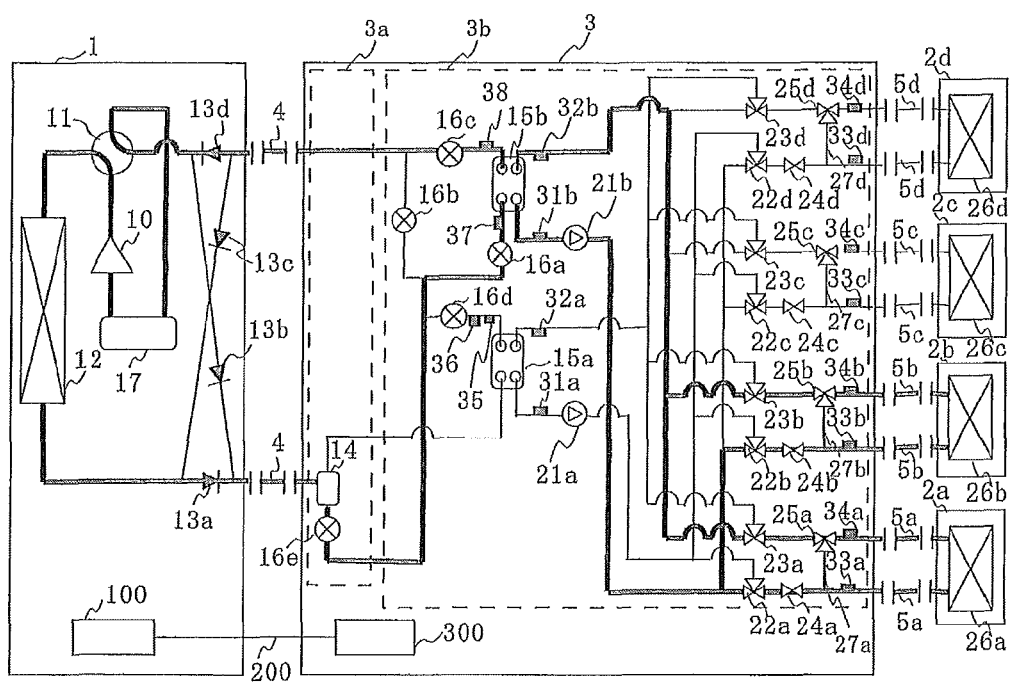
[FIG. 4]

FIG. 4 is a diagram showing the flows of a refrigerant and a heat medium at the time of cooling only operation respectively. Here, descriptions will be given to a case where the indoor units 2a and 2b perform cooling of each subjective indoor space 7 and the indoor units 2c and 2d are stopped. Firstly, the refrigerant flow in the refrigeration cycle will be explained. In the outdoor unit 1, the refrigerant sucked by the compressor 10 is compressed and discharged as a high-pressure gas refrigerant. The refrigerant having flowed out of the compressor 10 flows into the heat source side heat exchanger 12 that functions as a condenser through the four-way valve 11. The high-pressure gas refrigerant is condensed by the heat exchange with the air while passing through the heat source side heat exchanger 12, to turn into a high-pressure liquid refrigerant, flows out and passes through the check valve 13a (does not flow through the check valves 13b and 13c side because of the refrigerant pressure), further flowing into the relay unit 3 via the refrigerant pipeline 4.

The refrigerant having flowed into the relay unit 3 passes through the gas-liquid separator 14. At the time of cooling only operation, since the liquid refrigerant flows into the relay unit 3, no gas refrigerant flows in the intermediate heat exchanger 15a. Consequently, the intermediate heat exchanger 15a does not function. On the other hand, the liquid refrigerant passes through the expansion valves 16e and 16a to flow into the intermediate heat exchanger 15b. Here, since the relay unit side controller 300 controls the opening-degree of the expansion valve 16a to decompress the refrigerant by adjusting the refrigerant flow amount, the low-temperature low-pressure gas-liquid two-phase refrigerant flows into the intermediate heat exchanger 15b.

Since the intermediate heat exchanger 15b functions as an evaporator for the refrigerant, the refrigerant passing through the intermediate heat exchanger 15b turns into a low-temperature low-pressure gas refrigerant and flows out while cooling the heat medium as an heat exchange object (while absorbing heat from the heat medium). The gas refrigerant having flowed out of the intermediate heat exchanger 15b passes through the expansion valve 16c to flow out from the relay unit 3. Then, it passes through the refrigerant, pipeline 4 to flow into the outdoor unit 1. Here, at the time of cooling only operation, the expansion valves 16b and 16d are made to have opening-degree with which no refrigerant flows, based on the instructions from the relay unit side controller 300. The expansion valves 16c and 16e are made to be full open based on the instructions from the relay unit side controller 300 in order that no pressure loss may be generated.

The refrigerant having flowed into the outdoor unit 1 passes through the check valve 13d to be sucked into the compressor 10 again via the four-way valve 11 and the accumulator 17.

Next, descriptions will be given to the heat medium flow in the heat medium circulation circuit. Here, in FIG. 4, it is not necessary to make the heat medium pass through the use side heat exchangers 26c and 26d of the indoor units 2c and 2d that require no heat transfer because of stopping. (The indoor space 7 need not be cooled. A thermo-off state is included.) Then, based on the instructions from the relay unit side controller 300, the check valves 24c and 24d are closed so that no heat medium is made to flow into the use side heat exchangers 26c and 26d.

The heat medium is cooled by the heat exchange with the refrigerant in the intermediate heat exchanger 15b. Then, the cooled, heat medium is sucked by the pump 21b to be sent out. The heat medium having flowed out of the pump 21b passes through the flow path switching valves 22a and 22b and the stop valves 24a and 24b. Then, through the flow amount adjustment by the flow amount adjustment valves 25a and 25b based on the instructions from the relay unit side controller 300, the heat medium flows into the use side heat exchangers 26a and 26b, which covers (supplies) necessary heat for the operation to cool the air in the indoor space 7. Here, the relay unit side controller 300 makes the flow amount adjustment valves 25a and 25b adjust the ratio of the heat medium passing through the use side heat exchangers 26a and 26b and the heat medium bypass pipelines 27a and 27b so as to make the use side heat exchanger outlet/inlet temperature difference between the temperature related to the detection of the third temperature sensors 33a and 33b and the temperature related to the detection of the fourth temperature sensors 34a and 34b approach a set target value.

The heat medium having flowed into the use side heat exchangers 26a and 26b exchanges heat with the air in the indoor space 7 and flows out. On the other hand, the remaining heat medium that has not flowed into the use side heat exchangers 26a and 26b passes through the heat medium bypass piping 27a and 27b with no contribution to air-conditioning of the indoor space 7.

The heat medium having flowed out of the use side heat exchangers 26a and 26b and the heat medium having passed through the heat medium bypass pipelines 27a and 27b meet at the flow amount adjustment valves 25a and 25b, and pass through the flow path switching valves 23a and 23b to flow into the intermediate heat exchanger 15b. The heat medium cooled in the intermediate heat exchanger 15b is sucked by the pump 21b again to be sent out.

Figure 5:
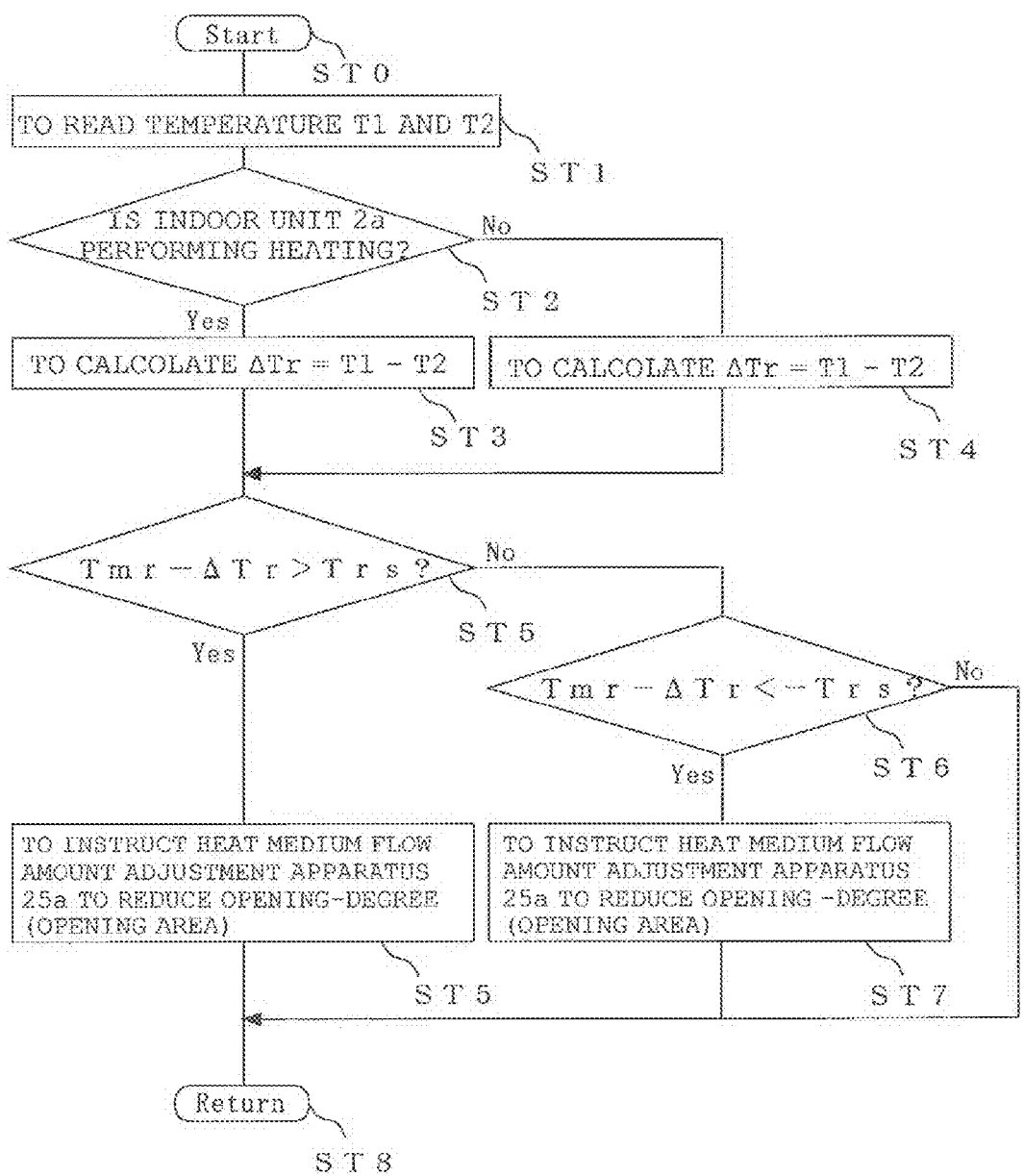
[FIG. 5]

FIG. 5 is a diagram showing a flow chart of processing related to adjustment of the flow amount adjustment valve 25 performed by the relay unit side controller 300 (heat medium flow amount control means 301). Here, descriptions will be given to processing related to adjustment of the flow amount adjustment valve 25a. However, the flow amount adjustment valves 25b to 25d perform the same processing.

When processing starts (ST0), the relay unit side controller 300 judges (reads) the temperature T1 related to the detection of the third temperature sensor 33a and the temperature T2 related to the detection of the fourth temperature sensor 34a based on signals transmitted from the third temperature sensor 33a and the fourth temperature sensor 34a (ST1). Then, it is judged whether the indoor unit 2a performs heating (ST2). When it is judged that the indoor unit 2a performs heating, the temperature T2 is subtracted from the temperature T1 and a use side heat exchanger input/output temperature difference $\Delta Tr$ is calculated (ST3). To the contrary, when it is judged that the indoor unit 2a performs no heating, the temperature T1 is subtracted from the temperature T2 and a use side heat exchanger input/output temperature difference $\Delta Tr$ is calculated (ST4).

Then, it is judged whether the value obtained by subtracting the use side heat exchanger input/output temperature difference $\Delta Tr$ from a control target value Tmr is larger than an upper limit Trs of a stable range (ST5). When judged to be larger, the flow amount adjustment valve 25a is instructed to reduce opening-degree (an opening area) (ST6). Thereby, the flow amount flowing through the use side heat exchanger 26a is made to be reduced. When judged to be not larger than the upper limit value Trs of the stable range (to be equal or smaller than Trs), it is judged whether the value is smaller than the lower limit value −Trs of the stable range (ST7). When judged to be smaller, the flow amount adjustment valve 25a is instructed to increase the opening-degree (the opening area) (ST8). Thereby, the flow amount flowing through the use side heat exchanger 26a is made to be increased. As long as the value obtained by subtracting the use side heat exchanger input/output temperature difference $\Delta Tr$ from the control target value Tmr is within the stable range ($-Trs = <Tmr - \Delta Tr = <Trs$), no instruction is given to the flow amount adjustment valve 25a on opening-degree change in particular. The above-mentioned processing is repeated, for example, at a predetermined interval (ST9). The relay unit side controller 300 performs the processing in each operation form to be mentioned later as well.

For example, at the time of cooling, in a case when the control target value is 5 degrees C. and the stable range is 1 degree C., if the use side heat exchanger input/output temperature difference $\Delta Tr$ is 3 degrees C., the opening-degree (the opening area) of the flow amount adjustment valves 25a to 25d is controlled to be reduced to decrease the flow amount flowing through the use side heat exchangers 26a to 26d. If the use side heat exchanger input/output temperature difference $\Delta Tr$ is 7 degrees the opening-degree (the opening area) of the flow amount adjustment valves 25a to 25d is controlled to be increased to increase the flow amount flowing through the use side heat exchangers 26a to 26d. As mentioned above, the use side heat exchanger input/output temperature difference $\Delta Tr$ is made to approach the control target value.

Here, it is possible to make the stable range Trs 0 degree C. to make the opening-degree of the flow amount adjustment valve 25a follow finely according to the use side heat exchanger input/output temperature difference $\Delta Tr$. However, by providing the stable range Trs, it is possible to reduce frequency of change in the opening-degree of the flow amount adjustment valves 25a to 25d to decrease load related to the opening. Therefore, life of the flow amount adjustment valves 25a to 25d can be extended.

Heating Only Operation

Figure 6:
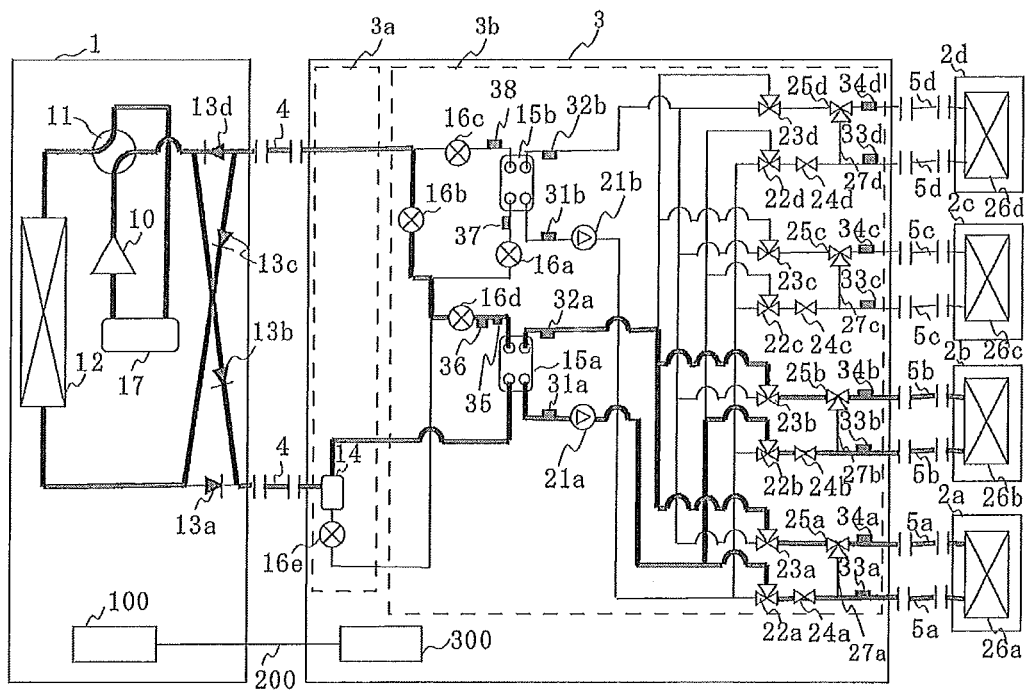
[FIG. 6]

FIG. 6 is a diagram showing the refrigerant and the heat medium flow at the time of heating only operation respectively. Here, descriptions will be given to a case where the indoor units 2a and 2b perform heating and the indoor units 2c and 2d are stopped. Firstly, the refrigerant flow in the refrigeration cycle will be explained. In the outdoor unit 1, the refrigerant sucked into the compressor 10 is compressed and discharged as a high-temperature gas refrigerant. The refrigerant having flowed out of the compressor 10 flows through the four-way valve 11 and the check valve 13b. Further it passes through the refrigerant pipeline 4 to flow into the relay unit 3.

The gas refrigerant having flowed into the relay unit 3 passes through the gas-liquid separator 14 to flow into the intermediate heat exchanger 15a. Since the intermediate heat exchanger 15a functions as a condenser for the refrigerant, the refrigerant passing through the intermediate heat exchanger 15a becomes a liquid refrigerant to flow out while heating the heat medium as a heat exchange object (while releasing heat to the heat medium).

The refrigerant having flowed out from the intermediate heat exchanger 15a passes through the expansion valves 16d and 16b, flows out from the relay unit 3, and flows into the outdoor unit 1 via the refrigerant pipeline 4. Then, since the relay unit side controller 300 adjusts the refrigerant flow amount by controlling the opening-degree of the expansion valve 16b or the expansion valve 16d to decompress the refrigerant, a low-temperature low-pressure gas-liquid two-phase refrigerant flows out from the relay unit 3. Here, the expansion valve 16a or 16c and the expansion valve 16e in the heating only operation are made to have the opening-degree such that no refrigerant flows based on the instructions from the relay unit side controller 300.

The refrigerant having flowed into the outdoor unit 1 flows into the heat source side heat exchanger 12 that functions as an evaporator via the check valve 13c. The low-temperature low-pressure gas-liquid two-phase refrigerant evaporates through the heat exchange with the outer air while passing through the heat source side heat exchanger 12 and turns into a low-temperature low-pressure gas refrigerant. The refrigerant having flowed out from the heat source side heat exchanger 12 is sucked into the compressor 10 again via the four-way valve 11 and the accumulator 17.

Next, descriptions will be given to the heat medium flow in the heat medium circulation circuit. Here, in FIG. 6, there is no need to make the heat medium to pass through the use side heat exchangers 26c and 26d of the indoor units 2c and 2d to which no heat is required to be carried because of stopping. (The indoor space 7 need not be heated. A thermo-off state is included.) Therefore, the stop valves 24c and 24d are closed based on the instructions from the relay unit side controller 300 so that no heat medium flows in the use side heat exchangers 26c and 26d.

The heat medium is heated by the heat exchanger with the refrigerant in the intermediate heat exchanger 15a. The heated heat medium is sucked by the pump 21a to be sent out. The heat medium having flowed out from the pump 21a passes through the flow path switching valves 22a and 22b and stop valves 24a and 24b. Through the flow amount adjustment by the flow amount adjustment valves 25a and 25b based on the instructions from the relay unit side controller 300, the heat medium that covers (supplies) necessary heat for the operation to heat the air of the indoor space 7 flows into the use side heat exchangers 26a and 26b. Here, in heating only operation, the relay unit side controller 300 makes the flow amount adjustment valves 25a and 25b adjust the ratio of the heat medium passing through the use side heat exchangers 26a and 26b and the heat medium bypass pipelines 27a and 27b so that the temperature difference between the temperature related to the detection by third temperature sensors 33a and 33b and the temperature related to the detection by the fourth temperature sensors 34a and 34b is made to be a set target value.

The heat medium having flowed into the use side heat exchangers 26a and 26b exchanges heat with the air in the indoor space 7 and flows out. On the other hand, the remaining heat medium that has not flowed into the use side heat exchangers 26a and 26b passes through the heat medium bypass pipelines 27a and 27b with no contribution to the air-conditioning of the indoor space 7.

The heat medium having flowed out of the use side heat exchangers 26a and 26b and the heat medium having passed through the heat medium bypass pipelines 27a and 27b are merged at the flow amount adjustment valves 25a and 25b. Further, they pass through the flow path switching valves 23a and 23b to flow into the intermediate heat exchanger 15a. The heat medium heated in the intermediate heat exchanger 15b is sucked by the pump 21a again to be sent out.

Cooling-Main Operation

Figure 7:
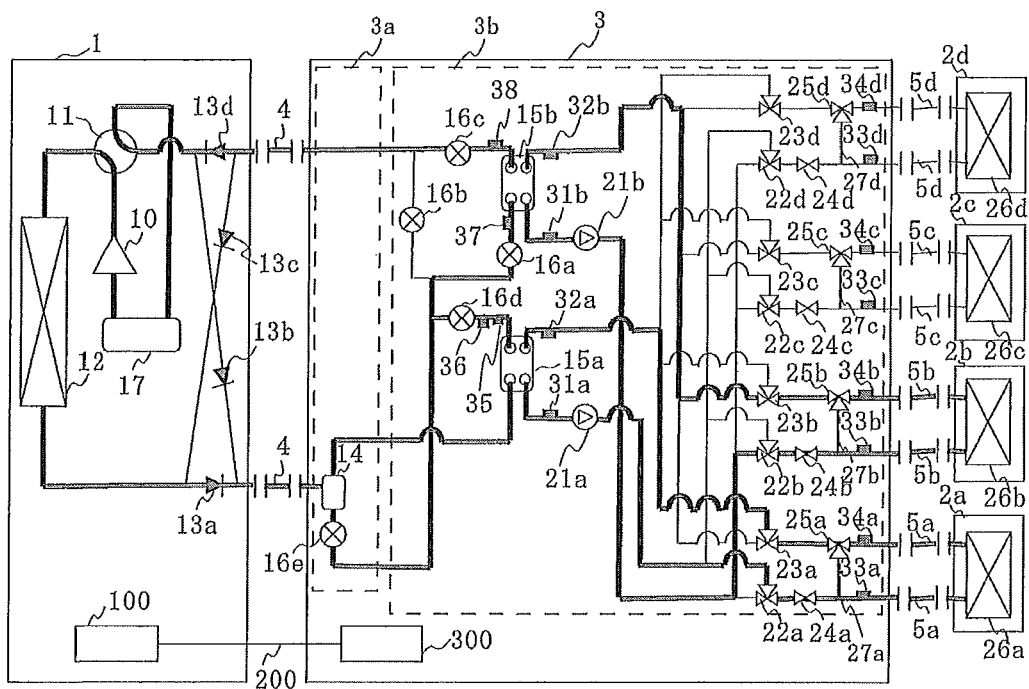
[FIG. 7]

FIG. 7 is a diagram showing the refrigerant and the heat medium flow at the time of cooling-main operation. Here, descriptions will be given to a case where the indoor unit 2a performs heating, the indoor unit 2b performs cooling, and the indoor units 2c and 2d are stopped. Firstly, the refrigerant flow in the refrigeration cycle will be explained. In the outdoor unit 1, the refrigerant sucked into the compressor 10 is compressed and discharged as a high-temperature gas refrigerant. The refrigerant having flowed out from the compressor 10 flows into the heat source side heat exchanger 12 via the four-way valve 11. The high-pressure gas refrigerant is condensed through the heat exchange with the air while passing through the heat source side heat exchanger 12. Here, in the case of cooling-main operation, the gas-liquid two-phase refrigerant is adapted to be flowed out from the heat source side heat exchanger 12. The gas-liquid two-phase refrigerant having flowed out from the heat source side heat exchanger 12 flows through the check valve 13a. Then, it flows into the relay unit 3 via the refrigerant pipeline 4.

The refrigerant having flowed into the relay unit 3 passes through the gas-liquid separator 14. The gas-liquid two-phase refrigerant is separated into the liquid refrigerant and the gas refrigerant in the gas-liquid separator 14. The gas refrigerant separated in the gas-liquid separator 14 flows into the intermediate heat exchanger 15a. The refrigerant having flowed into the intermediate heat exchanger 15a turns into a liquid refrigerant while heating the heat medium as heat-exchange object by condensation, and flows out to pass through the expansion valve 16d.

On the other hand, the liquid refrigerant separated in the gas-liquid separator 14 passes through the expansion valve 16e, meets with the liquid refrigerant passing through the expansion valve 16d, passes through the expansion valve 16a and flows into the intermediate heat exchanger 15b. Here, since the relay unit side controller 300 decompresses the refrigerant by controlling the opening-degree of the expansion valve 16a to adjust the refrigerant flow amount, a low-temperature low-pressure gas-liquid two-phase refrigerant flows into the intermediate heat exchanger 15b. The refrigerant having flowed into the intermediate heat exchanger 15b turns into a low-temperature low-pressure gas refrigerant while cooling the heat medium as a heat exchange object through evaporation and flows out. The gas refrigerant having flowed out from the intermediate heat exchanger 15b passes through the expansion valve 16c to flow out from the relay unit 3, and it passes through the refrigerant pipeline 4 to flow into the outdoor unit 1. Here, the expansion valve 16b at the time of cooling-main operation is made to have an opening-degree, with which no refrigerant flows, based on the instructions from the relay unit side controller 300. The expansion valve 16c is made to be full open based on the instructions from the relay unit side controller 300 so that no pressure loss is generated.

The refrigerant having flowed into the outdoor unit 1 passes through the check valve 13d to be sucked into the compressor 10 again via the four-way valve 11 and the accumulator 17.

Next, descriptions will be given to the heat medium flow in the heat medium circulation circuit. Here, in FIG. 7, it is not necessary to make the heat medium pass through the use side heat exchanger 26c and 26d of the indoor units 2c and 2d subjected to no air-conditioning load because of stopping. (The indoor space 7 need not to be cooled or heated. A thermo-off state is included.) Then, based on the instructions from the relay unit side controller 300, the stop valves 24c and 24d are closed so that no heat medium flows into the use side heat exchangers 26c and 26d.

The heat medium is cooled by exchanging heat with the refrigerant in the intermediate heat exchanger 15b. Then, the cooled heat medium is sucked by the pump 21b to be sent out. In the meantime, the heat medium is heated by exchanging heat with the refrigerant in the intermediate heat exchanger 15a. Then, the heated heat medium is sucked by the pump 21a to be sent out.

The cooled heat medium having flowed out from the pump 21b passes through the flow path switching valve 22b and the stop valve 24b. The heated heat medium having flowed out from the pump 21a passes through the flow path switching valve 22a and the stop valve 24a. Thus, the flow path switching valve 22a allows heated heat medium to pass and cooled heat medium to be shut off. The flow path switching valve 22b allows cooled heat medium to pass and heated heat medium to be shut off. Therefore, during the circulation, the flow paths in which cooled heat medium and heated heat medium flow are separated, being never mixed.

Through flow amount adjustment by the flow amount adjustment valves 25a and 25b based on the instructions from the relay unit side controller 300, the heat medium that covers (supplies) the necessary heat for the operation to cool and heat the air in the indoor space flows into the use side heat exchangers 26a and 26b. Here, the relay unit side controller 300 makes the flow amount adjustment valves 25a and 25b adjust the ratio of the heat medium passing through the use side heat exchangers 26a and 26b and the heat medium bypass pipelines 27a and 27b so that the temperature differences between the temperatures related to the detection by the third temperature sensors 33a and 33b and the temperatures related to the detection by the fourth temperature sensors 34a and 34b are made to be a set target value respectively.

The heat medium having flowed into the use side heat exchangers 26a and 26b exchanges heat with the air in the indoor space 7 and flows out. On the other hand, the remaining heat medium that has not flowed into the use side heat exchangers 26a and 26b passes through the heat medium bypass pipelines 27a and 27b with no contribution to air-conditioning of the indoor space 7.

The heat medium having flowed out of the use side heat exchangers 26a and 26b and the heat medium having passed through the heat medium bypass piping 27a and 27b are merged at the flow amount adjustment valves 25a and 25b. Further, they pass through the flow path switching valves 23a and 23b to flow into the intermediate heat exchanger 15b. The heat medium cooled in the intermediate heat exchanger 15b is sucked by the pump 21b again to be sent out. Similarly, the heat medium heated in the intermediate heat exchanger 15a is sucked by the pump 21a again to be sent out.

Heating-Main Operation

Figure 8:
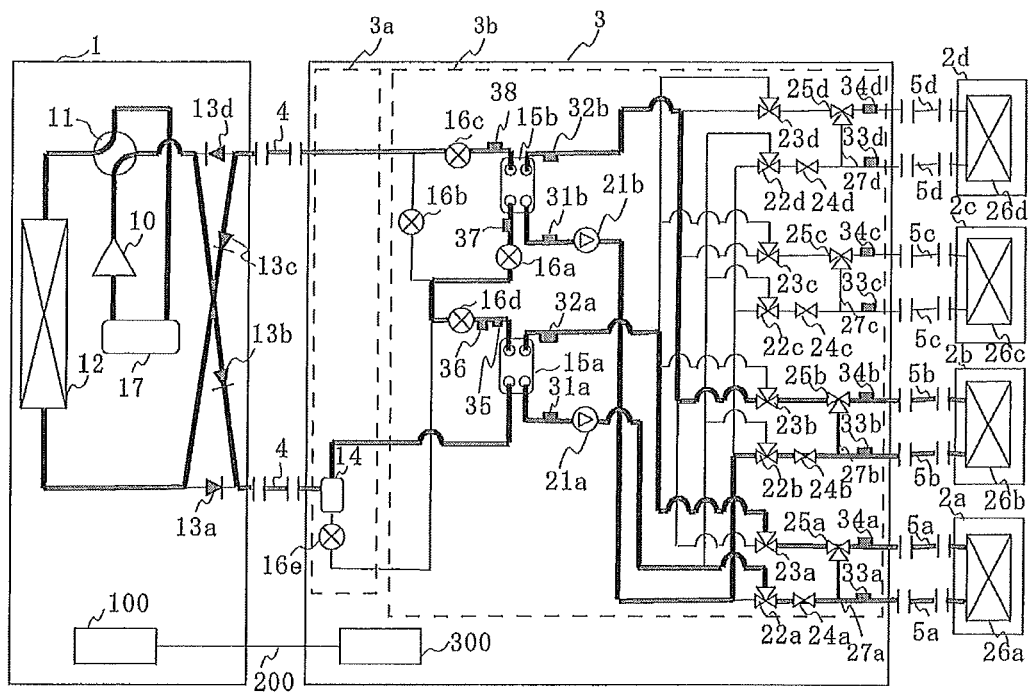
[FIG. 8]

FIG. 8 is a diagram showing each refrigerant and heat medium flow at the time of heating-main operation. Here, descriptions will be given to a case where the indoor unit 2a performs heating, the indoor unit 2b performs cooling, and the indoor units 2c and 2d are stopped. Firstly, the refrigerant flow in the refrigeration cycle will be explained. In the outdoor unit 1, the refrigerant sucked into the compressor 10 is compressed and discharged as a high-temperature gas refrigerant. The refrigerant having flowed out the compressor 10 flows through the four-way valve 11 and the check valve 13b. Further, it passes through the refrigerant pipeline 4 to flow into the relay unit 3.

The refrigerant having flowed into the relay unit 3 passes through the gas-liquid separator 14. The gas refrigerant having passed through the gas-liquid separator 14 flows into the intermediate heat exchanger 15a. The refrigerant having flowed into the intermediate heat exchanger 15a turns into the liquid refrigerant while heating the heat medium as a heat exchange object through condensation, flows out therefrom, and passes through the expansion valve 16d. Here, the expansion valve 16e at the time of heating-main operation is made to have an opening-degree, with which no refrigerant flows, based on instructions from the relay unit controller 300.

The refrigerant having passed through the expansion valve 16d further passes through the expansion valves 16a and 16b. The refrigerant having passed through the expansion valve 16a flows into the intermediate heat exchanger 15b. Here, since the relay unit side controller 300 controls the opening-degree of the expansion valve 16a and adjusts the flow amount of the refrigerant to decompress the refrigerant, a low-temperature low-pressure gas-liquid two-phase refrigerant flows into the intermediate heat exchanger 15b. The refrigerant having flowed into the intermediate heat exchanger 15b turns into a low-temperature low-pressure gas refrigerant while cooling the heat medium as a heat exchange object through evaporation and flows out. The gas refrigerant having flowed out from the intermediate heat exchanger 15b passes through the expansion valve 16c. On the other hand, the refrigerant having passed through the expansion valve 16b turns into a low-temperature low-pressure gas-liquid two-phase refrigerant as well because the relay unit side controller 300 controls the opening-degree of the expansion valve 16a and meets with the gas refrigerant having passed through the expansion valve 16c. Therefore, the refrigerant becomes a low-temperature low-pressure refrigerant having larger dryness. The met refrigerant flows into the outdoor unit 1 via the refrigerant pipeline 4.

The refrigerant having flowed into the outdoor unit 1 flows into the heat source side heat exchanger 12 that functions as an evaporator via the check valve 13c. The low-temperature low-pressure gas-liquid two-phase refrigerant evaporates through the heat exchange with the air while passing through the heat source side heat exchanger 12 and turns into a low-temperature low-pressure gas refrigerant. The refrigerant having flowed out from the heat source side heat exchanger 12 is sucked into the compressor 10 again via the four-way valve 11 and the accumulator 17.

Next, descriptions will be given to the heat medium flow in the heat medium circulation circuit. Here, in FIG. 8, there is no need to make the heat medium pass through the use side heat exchangers 26c and 26d of the indoor units 2c and 2d to which no air-conditioning load is imposed because of stopping. (The indoor space 7 need not be cooled or heated. A thermo-off state is included). Therefore, the stop valves 24c and 24d are closed based on the instructions from the relay unit side controller 300 so that no heat medium flows in the use side heat exchangers 26c and 26d.

The heat medium is cooled by exchanging heat with the refrigerant in the intermediate heat exchanger 15b. The cooled heat medium is sucked by the pump 21b to be sent out. In the meantime, the heat medium is heated by exchanging heat with the refrigerant in the intermediate heat exchanger 15a. The heated heat medium is sucked by the pump 21a to be sent out.

The cooled heat medium having flowed out from the pump 21b passes through the flow path switching valve 22b and the stop valve 24b. The heated heat medium having flowed out from the pump 21a passes through the flow path switching valve 22a and the stop valve 24a. Thus, the flow path switching valve 22a makes heated heat medium pass and shuts off cooled heat medium. The flow path switching valve 22b makes cooled heat medium pass and shuts off heated heat medium. Therefore, during the circulation, cooled heat medium and heated heat medium are separated, being never mixed.

Through the flow amount adjustment by the flow amount adjustment valves 25a and 25b based on the instructions from the relay unit side controller 300, the heat medium that covers (supplies) the necessary heat for the operation to cool and heat the air in the indoor space 7 flows into the use side heat exchangers 26a and 26b. Here, the relay unit side controller 300 makes the flow amount adjustment valves 25a and 25b adjust the ratio of the heat medium passing through the use side heat exchangers 26a and 26b and the heat medium bypass pipelines 27a and 27b so that the temperature differences between the temperatures related to the detection by the third temperature sensors 33a and 33b and the temperatures related to the detection by the fourth temperature sensors 34a and 34b are made to be a set target value, respectively.

The heat medium having flowed into the use side heat exchangers 26a and 26b exchanges heat with the air in the indoor space 7 and flows out. On the other hand, the remaining heat medium that has not flowed into the use side heat exchangers 26a and 26b passes through the heat medium bypass pipelines 27a and 27b with no contribution to air-conditioning of the indoor space 7.

The heat medium having flowed out of the use side heat exchangers 26a and 26b and the heat medium having passed through the heat medium bypass pipelines 27a and 27b are merged at the flow amount adjustment valves 25a and 25b. Further, they pass through the flow path switching valves 23a and 23b to flow into the intermediate heat exchanger 15b. The heat medium cooled in the intermediate heat exchanger 15b is sucked by the pump 21b again to be sent out. Similarly, the heat medium heated in the intermediate heat exchanger 15a is sucked by the pump 21a again to be sent out.

As mentioned above, when performing heating in the indoor units 2a to 2d, in order to supply heated heat medium to the use side heat exchangers 26a to 25d, corresponding flow path switching valves 22a to 22d and 23a to 23d are switched to flow paths to be connected with the intermediate heat exchanger 15a for heating the heat medium. When performing cooling in the indoor units 2a to 2d, in order to supply cooled heat medium to the use side heat exchangers 26a to 26d, corresponding flow path switching valves 22a to 22d and 23a to 23d are switched to flow paths to be connected with the intermediate heat exchanger 15b for cooling the heat medium. Through the above switching, heating and cooling can be freely performed in each indoor unit 2a to 2d.

Here, the flow path switching valves 22a to 22d and 23a to 23d are not limited to the three-way switching valves shown in FIG. 3 and the like. Switching valves that can switch flow paths in three directions may be allowable, such as an apparatus that can switch the flow paths by combining two on-off valves each of which performs on-off of a two-way flow path. An apparatus that can change flow amount of three-way flow paths, such as a mixing valve of a stepping motor drive type, may be allowable as well. An apparatus may be allowable that can change the flow amount in three directions by combining two switching valves each of which can change the flow amount of a two-way flow path such as an electronic expansion valve. Here, in the case of an apparatus that can change the flow amount, since switching can be gradually performed while adjusting the flow amount, it is possible to prevent water hammer.

The air-conditioning load (heat amount to he supplied) related to the use side heat exchangers 26a to 26d is represented by the following formula (1). Formula (1) is obtained by multiplying the flow amount, density, and constant pressure specific heat of the heat medium and the temperature difference of the heat medium at the inlet and the outlet of the use side heat exchangers 26a to 26d. Here, Vw denotes the flow amount of the heat medium, ρw the density of the heat medium, and Cpw the constant pressure specific heat of the heat medium. Further, $Tw_{in}$ denotes the temperature value of the heat medium at the inlet of the use side heat exchangers 26a to 26d and $Tw_{out}$ denotes the temperature value of the heat medium at the outlet of the use side heat exchangers 26a to 26d.

Formula 1

$$Q = V_w^* (\rho_{win}^* C p_{win}^* T_{win} - \rho_{wout}^* C p_{wout}^* T_{wout}) \\ \sim V_w^* \rho_w^* C p_w^* (T_{win} - T_{wout}) \quad (1)$$

According to formula (1), it is found that when the flow amount of the heat medium flowing through the use side heat exchangers 26a to 26d is constant, in order to keep the temperature difference of the heat medium at the inlet/outlet constant, the flow amount of the heat medium passing through the use side heat exchangers 26a to 26d may be changed according to change in the air-conditioning load in the indoor units 2a to 2d (the use side heat exchangers 26a to 26d).

Then, as shown in the flow chart of FIG. 5, by controlling the flow amount adjustment valves 25a to 25d so that the difference between the temperature difference of the inlet/outlet of the use side heat exchangers 26a to 26d and a target value falls within a stable range, the relay unit side controller 300 makes an excess heat medium flow into the heat medium bypass pipelines 27a to 27d to control the flow amount flowing into the use side heat exchangers 26a to 26d.

Here, as shown in FIG. 3 and the like, descriptions has been given to a case where flow amount adjustment valves 25a to 25d are installed on the downstream side of the use side heat exchangers 26a to 26d, as a mixing valve that makes the heat medium having flowed through the use side heat exchangers 26a to 26d and the heat medium having flowed through the heat medium bypass pipelines 27a to 27d merged (mix). However, they are not limited to the mixing valves. They may be installed as a three-way valve on the upstream side of the use side heat exchangers 26a to 26d as well.

The heat medium that has performed heat exchange with the use side heat exchangers 26a to 26d and the heat medium that has passed through the heat medium bypass pipelines 27a to 27d with no heat exchange and no temperature change meet at the flow amount adjustment valves 25a to 25d. The temperature Tw of the heat medium having met is expressed by the following formula (2). $Tw_{in}$ denotes the temperature value of the heat medium at the inlet of the use side heat exchangers 26a to 26d and $Tw_{out}$ denotes the temperature value of the heat medium at the outlet of the use side heat exchangers 26a to 26d. Vw denotes the flow amount of the heat medium flowing into the flow amount adjustment valves 25a to 25d and Vwr denotes the flow amount of the heat medium flowing into the use side heat exchangers 26a to 2.6d.

Formula 2

$$T_w = (V_{wr}/V_w)^* T_{wout} + (1 - V_{wr}/V_w)^* T_{win} \quad (2)$$

Here, the temperature of the heat medium having passed through the use side heat exchangers 26a to 26d decreases at the time of heating and increases at the time of cooling through the heat exchange with the air. The heat medium having passed through the heat medium bypass pipelines 27a to 27d performs no heat exchange and undergoes no change in temperature. Therefore, the temperature Tw of the merged heat medium approaches the temperature of the heat medium at the inlet of the use side heat exchangers 26a to 26d according to the flow amount of the heat medium having passed through the bypass pipelines 27a to 27d. For example, suppose that the total flow amount passing through the flow amount adjustment valve 25a to 25d is 20 L/min after the confluence. Suppose the temperature of the heat medium at the inlet of the use side heat exchangers 26a to 26d is 7 degrees C. and the temperature of the heat medium at the outlet is 13 degrees C. Then, when the flow amount of the heat medium flowing through the use side heat exchangers 26a to 26d is 10 L/min, the temperature Tw of the merged heat medium becomes 10 degrees C. by equation (2).

The merged heat medium is further merged to finally flow into the intermediate heat exchangers 15a and 15b. Then, the temperature difference of the refrigerant at the inlet and outlet becomes almost the same through the heat exchange of the intermediate heat exchangers 15a and 15b unless heat exchange amount in the intermediate heat exchangers. 15a and 15b changes. For example, suppose that the temperature difference of the refrigerant at the inlet and outlet of the intermediate heat exchanger 15b is 6 degrees C. Further, suppose that the temperature of the heat medium of the intermediate heat exchanger 15b is 13 degrees C. at the inlet side, and 7 degrees C. at the outlet side, originally. Then, suppose that the air-conditioning load related to the use side heat exchangers 26a to 26d is reduced to cause the temperature at the inlet side of the heat medium of the intermediate heat exchangers 15b to decrease down to 10 degrees C. Here, if nothing is done, since heat exchange of almost the same heat amount is performed in the intermediate heat exchangers 15, the temperature at the outlet side of the heat medium becomes 4 degrees C. and the heat medium flows out of the intermediate heat exchanger 15b. Repetition of such a heat medium circulation results in a rapid decrease in the temperature of the heat medium.

In order to prevent the above, the temperature at the outlet side (flow-out side) of the heat medium related to the detection by a first temperature sensor 31a is made to approach (to be maintained) a set target value regardless the air-conditioning load, related to the use side heat exchangers 26a to 26d. Instead, the rotation speed (the discharge flow amount of the heat medium per unit time) of the pumps 21a and 21b may be changed in response to changes in the air-conditioning load of the use side heat exchangers 26a to 26d. Thereby, when the air-conditioning load decreases in the use side heat exchangers 26a to 26d, the rotation speed of the pump 21 decreases to promote energy saving. When the air-conditioning load related to the use side heat exchangers 26a to 26d increases, necessary heat amount of heat exchange for the air-conditioning load can be covered by increasing the rotation speed of the pump 21.

Figure 9:
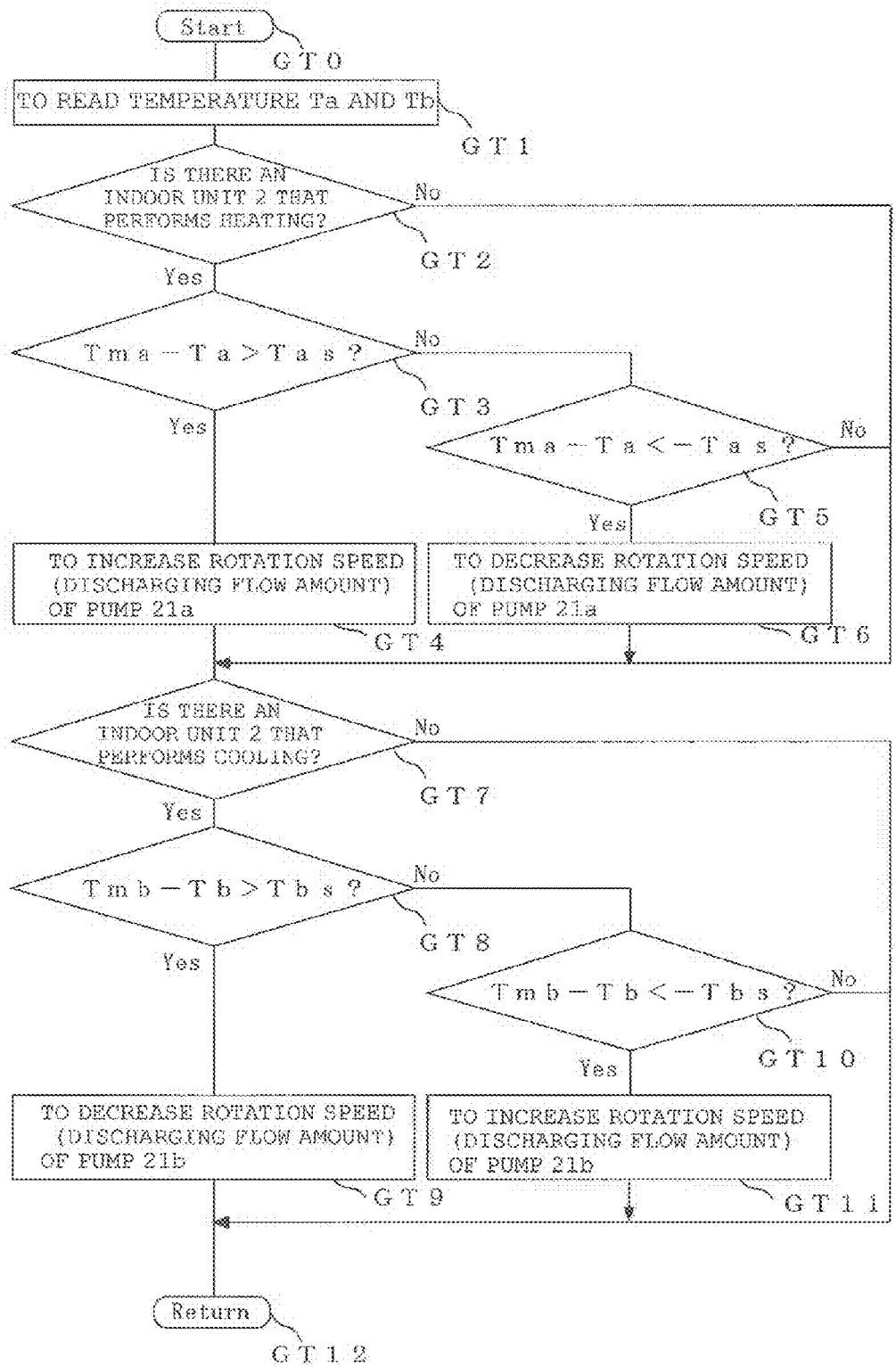
[FIG. 9]

FIG. 9 is a diagram showing the flow chart of the processing related to the control of the rotation speed (the flow amount of the heat medium to be fed out) of the pumps 21a and 21b performed by the relay unit side controller 300 (heat medium delivery control means 302). When processing starts (GT0), the relay unit side controller 300 judges (reads) the temperature Ta related to the detection by a first temperature sensor 31a and the temperature Tb related to the detection by a first temperature sensor 31b (GT1). Then, it is judged whether any indoor unit 2 performing heating exists or not (GT2). When it is judged that there is an indoor unit 2 performing heating, it is judged whether the value obtained by subtracting the temperature Ta from a control target value Tma is larger than an upper limit value Tas showing a stable range (GT3). When judged to be larger, the pump 21a is instructed to increase the rotation speed and increases the flow amount of the heat medium to be delivered by the pump 21a (GT4). When judged not to be larger than the upper limit value Tas (equal to or smaller than Tas) showing the stable range, it is judged whether it is smaller than a lower limit, value—Tas showing the stable range (GT5). When judged to be smaller, the pump 21a is instructed to decrease the rotation speed and decreases the flow amount of the refrigerant to be delivered by the pump 21a (GT6). If the value obtained by subtracting the temperature Ta from the control target value Tma is within the stable range (−Tas=<Tma−Ta=<TaS), no instruction is given to the pump 21a in particular and no change in the rotation speed is caused.

On the other hand, when it is judged that the processing related to the flow amount of the heat medium delivered by the pump 21a in GT3 to GT6 is terminated or no indoor unit 2 performs heating in GT2, it is judged whether there is any indoor unit 2 that performs cooling (GT7). When it is judged that there is an indoor unit 2 performing cooling, it is judged whether the value obtained by subtracting the temperature Tb from a control target value Tmb is larger than an upper limit value Tbs showing a stable range (GT8). When judged to be larger, the pump 21a is instructed to decrease the rotation speed and decreases the flow amount of the heat medium to be delivered by the pump 21b (GT9). When judged not to be larger than the upper limit value Tbs (equal to or smaller than Tbs) showing the stable range, it is judged whether it is smaller than a lower limit value—Tbs showing the stable range (GT10). When judged to be smaller, the pump 21a is instructed to increase the rotation speed and increases the flow amount of the heat medium to be delivered by the pump 21b (GT11). If the value obtained by subtracting the temperature Tb from the central target value Tmb is within the stable range (−Tbs=<Tmb−Tb=<Tbs), no instruction is given to the pump 21b and no change in the rotation speed is caused. The above-mentioned processing is repeated for every certain time, for example (GT12).

For example, when it is judged that there is an indoor unit 2 that performs heating, it is supposed that the control target value Tma is 45 degrees C. and the stable range Tas is 1 degree C. If the temperature Ta is 40 degrees C., the rotation speed of the pump 21a is increased to increase the flow amount of the heat medium to be delivered and the temperature Ta is increased to approach the control target value Tma. On the other hand, if the temperature Ta is 50 degrees C., the rotation speed of the pump 21b is decreased to decrease the flow amount of the heat medium to be delivered and the temperature Ta is decreased to approach the control target value Tma.

Further, when it is judged that there is an indoor unit 2 that performs cooling, the control target value Tms is supposed to be 7 degrees C. and the stable range Tbs 1 degree C. If the temperature Tb is 5 degrees C., the rotation speed of the pump 21b is decreased to decrease the flow amount of the heat medium to be delivered and the temperature Tb is increased to approach the control target value Tmb. On the other hand, if the temperature Tb is 9 degrees C., the rotation speed of the pump 21b is increased to increase the flow amount of the heat medium to be delivered and the temperature Tb is decreased to approach the control target value Tmb.

Here, it is possible to make the stable ranges Tas and Tbs 0 degree C. and make the rotation speed of the pumps 21a and 21b finely change according to the temperatures Ta and Tb. However, since by providing the stable ranges Tas and Tbs, the frequency of changing the rotation speed can be reduced, the life of the pumps 21a and 21b can be extended.

Here, the relay unit side controller 300 performed processing of controlling the rotation speed of the pumps 21a and 21b based on the temperatures Ta and Tb related to the detection by the first temperature sensors 31a and 31b. For example, in place of the temperatures related to the detection by the first temperature sensors 31a and 31b, processing of the rotation speed control of the pumps 21a and 21b may be performed based on the temperatures related to the detection by the second temperature sensors 32a and 32b.

Therefore, in order to control the pumps 21a and 21b, either the first temperature sensors 31a and 31b or the second temperature sensors 32a and 32b may be enough and the other heat medium temperature detection means is not required to be provided.

The relay unit side controller 300 drives the pump 21b when cooled heat medium is required by one or more use side heat exchangers 26a to 26d. With no request, it will stop the pump. The relay unit side controller 300 also drives the pump 21a when heated heat medium is required by one or more use side heat exchangers 26a to 26d. With no request, it will stop the pump. Thereby, energy saving is further promoted.

Here, in the intermediate heat exchanger 15a that heats the heat medium, the refrigerant releases heat to the heat medium to heat it. Therefore, the temperature at the outlet side (flow-outside) of the heat medium related to the detection by the first temperature sensor 31a does not become higher than the temperature of the refrigerant at the inlet side (flow-in side) of the intermediate heat exchanger 15a. Since the heating amount of the refrigerant in an superheat gas region is small, the temperature of the heat medium at the outlet side (flow-out side) is restricted by the condensing temperature obtained by the saturation temperature at the pressure related to the detection by the pressure sensor 36. In the intermediate heat exchanger 15b at the side of cooling the heat medium, the refrigerant absorbs heat from the heat medium to cool it. Therefore, the temperature of the heat medium at the outlet side (flow-out side) related to the detection by the first temperature sensor 31b does not become lower than the temperature of the refrigerant at the inlet side (flow-in side) of the intermediate heat exchanger 15b.

Here, the condensing temperature and the evaporating temperature of the refrigerant in the intermediate heat exchangers 15a and 15b change according to operation conditions of the apparatus in the refrigeration cycle. Therefore, the relay unit side controller 300 changes the setting of the control target temperatures Tma and Tmb based on the condensing temperature and the evaporating temperature of the refrigerant in the intermediate heat exchangers 15a and 15b, respectively.

For example, suppose that the above-mentioned control target value Tmb is set at 7 degrees C. in general. Then, suppose that the evaporating temperature of the refrigerant in the intermediate heat exchanger 15b at that time is, for example, 3 degrees C. Thereafter, let the evaporating temperature becomes, for example, 7 degrees C. Then, the temperature Tb related to the detection by the first temperature sensor 31b become higher than 7 degrees C. Therefore, it is difficult to make Tb approach the control target value Tmb, resulting in poor control of the rotation speed of the pump 21b. Then, the relay unit side controller 300 performs processing such that the control target value Tmb is changed to 11 degrees C. by adding the temperature increase 4 degrees C. of the refrigerant. Regarding the control target value Tma, the relay unit side controller 300 changes the setting based on the condensing temperature of the refrigerant in the intermediate heat exchanger 15a as well.

As mentioned above, in the air-conditioning apparatus of Embodiment 1, in the indoor unit 2 for heating or cooling the air in the indoor space 7, the heat medium circulates and no refrigerant circulates therein. Therefore, a safe air-conditioning apparatus can be obtained by preventing the refrigerant from leaking into the indoor space 7 in which people reside to cause an adverse effect on the people. By providing the relay unit 3 as a separate unit from the outdoor unit 1 and the indoor unit 2 and arranging each unit so that piping through which the heat medium circulates is made to be as short as possible, carrying power may be made small compared with a case where the heat medium is made to circulate between the outdoor unit and the indoor unit directly. Accordingly, energy saving can be achieved. In the air-conditioning apparatus of the present embodiment, it is possible to operate in any one of four forms (modes): cooling only operation, heating only operation, cooling-main operation, and heating-main operation. Under such operations, in the relay unit 3, there are provided intermediate heat exchangers 15a and 15b that perform heating and cooling of the heat medium respectively, and by the flow path switching valves 22a to 22d and 23a to 23d such as the two-way and the three-way switching valves, the heated heat medium and cooled heat medium can be supplied to the use side heat exchanger 26a to 26d in need thereof.

Further, the relay unit side controller 300 (heat medium flow amount control moans 301) is adapted to adjust the opening-degree of the flow amount adjustment valve 25 based on the temperature difference between the temperatures T1 and T2 related to the detection by the third temperature sensor 33 and the fourth temperature sensor 34 respectively, to adjust the flow amount of the heat medium to flow in the use side heat exchanger 26, so that it is possible to supply heat amount necessary for heat exchange in proportion to the air-conditioning load related to the use side heat exchanger 26. Then, by determining a stable range as a margin, the frequency of changing opening-degree can be reduced and the life of the flow amount adjustment valve 25 can be extended.

Further, the relay unit side controller 300 (heat medium flow amount controller 302) is adapted to control the rotation speed for each pump 21a and 21b based on the temperatures Ta and Tb related to the detection by the first temperature sensors 31a and 31b, so as to become the temperature denoted by a set control target value, so that flow amount adjustment can be performed in proportion to the air-conditioning load by the pumps 21a and 21b while maintaining the temperatures of the heated heat medium and cooled heat medium in the heat medium circulation circuit. For example, it is possible to reduce carrying power by such as reducing a discharging flow amount in proportion to the air-conditioning load, resulting in energy saving. By changing the setting of the control target value by the condensing temperature and the evaporating temperature of the refrigerant flowing through the intermediate heat exchangers 15a and 15b, control in a proper temperature range can be performed. By applying the above to the pumps 21a and 21b, both heated heat medium and cooled heat medium can be handled.

Incidentally, descriptions have been here given to the rotation speed control of the pump 21 according to the detected temperature by the first temperature sensor 31 or the second temperature sensor 32. However, it is allowable to install a temperature sensor for detecting the temperature of the heat medium at the outlet side of the pump 21 to control the rotation speed of the pump 21 by the temperature related to the detection. Although temperature rises by the amount of heat generation of the pump 21 compared with the inlet side of the pump 21, the target temperature may be set in consideration thereof.

Embodiment 2

Figure 10:
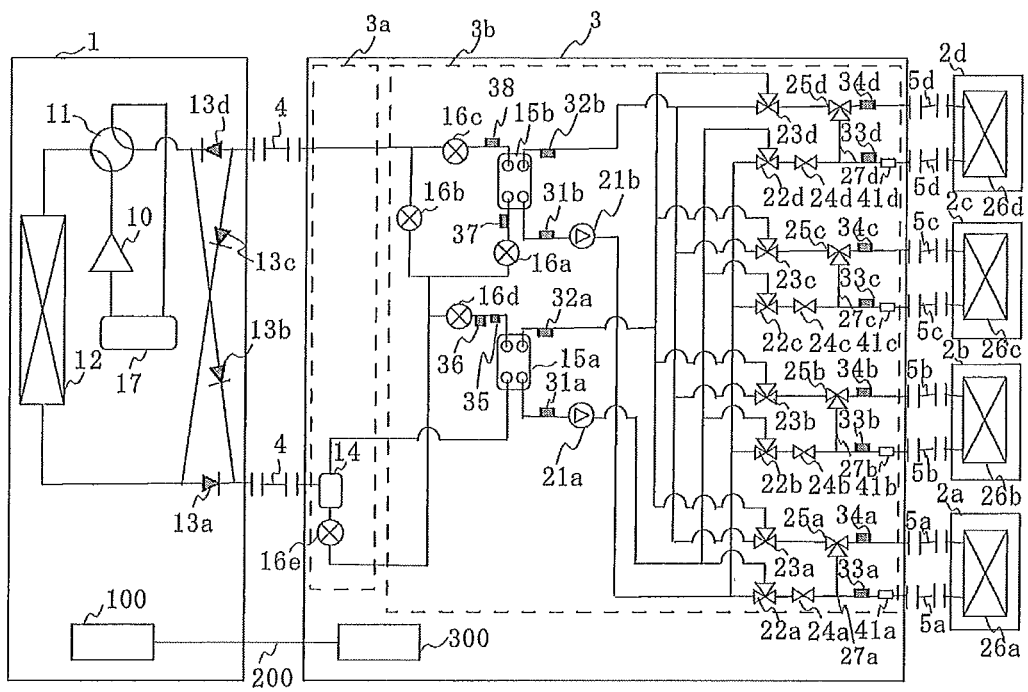
[FIG. 10]

FIG. 10 is a diagram showing the configuration of the air-conditioning apparatus according to Embodiment 2. In FIG. 10, flow amount meters 41a, 41b, 41c, and 41d detect the flow amount of the heat medium flowing through the use side heat exchangers 26a to 26d respectively to transmit signals related to the flow amount value to the relay unit side controller 300. In the present embodiment, for example, by providing the flow amount meters 41a to 41b, the relay unit side controller 300 is adapted to obtain the flow amount value of the heat medium flowing through the use side heat exchangers 26a to 26d. Based on the flow amount of the heat medium flowing through the use side heat exchangers 26a to 26d, the temperature related to the detection by the third temperature sensors 33a to 33d, and the temperature related to the detection by the fourth temperature sensors 34a to 34d, the relay unit side controller 300 can calculate the air-conditioning load related to the use side heat exchangers 26a to 26d from the above-mentioned formula (1).

In the Embodiment 1, descriptions have been given to the control related to the temperature difference in the heat medium at the inlet and outlet of the use side heat exchangers 26a to 26d by the flow amount adjustment by the flow amount adjustment valves 25a to 25d. Further, in order to make the temperature of the heat medium at the outlet side of the intermediate heat exchangers 15a and 15b approach the control target value, control of the pumps 21a and 21b has been explained. Sufficient control of each apparatus in the heat medium circulation circuit can be performed by the above-mentioned control. However, the flow amount of the heat medium delivered by the pumps 21a and 21b is not always balanced with the flow amount flowing through the use side heat exchangers 26a to 26d. For example, when by losing balance, too much flow amount of the heat medium is delivered by the pumps 21a and 21b, the flow amount flowing through the heat medium bypass pipelines 27a to 27d increases, resulting in imposing extra carrying power on the pumps 21a and 21b.

Here, if the relay unit side controller 300 could grasp the air-conditioning load related to the use side heat exchangers 26a to 26d, the heat medium of the flow amount that matches with the air-conditioning load can be delivered from the pumps 21a and 21b.

For example, the relay unit side controller 300 (heat medium delivering control means 302) stores the relation between the rotation speed and the discharging flow amount of the pumps 21a and 21b in a storage device (not shown). Here, based on the discharging flow amount of the pumps 21a and 21b, the temperature related to the detection by the second temperature sensors 32a and 32b, and the temperature related to the detection by the first temperature sensors 31a and 31b, the respective heat amount of the heat exchange related to heating and cooling of the heat medium in the intermediate heat exchangers 15a and 15b can be calculated.

Then, the relay unit side controller 300 calculates each total heat amount of the heated and cooled heat medium passing through the use side heat exchangers 26a to 26d based on the formula (1), for example. Then, the discharging flow amount of the pumps 21a and 21b is calculated with which the heat amount of the heat exchange in the intermediate heat exchangers 15a and 15b equals to the total heat amount of the heated and cooled heat medium. The rotation speed control of the pumps 21a and 21b is performed by the rotation speed based on each calculated discharging flow amount.

Here, in FIG. 10, the flow amount meters 41a to 41d are installed at the inlet side of the use side heat exchangers 26a to 26d. However, if the flow amount of the heat medium flowing through the use side heat exchangers 26a to 26d can be detected, the flow amount meters 41a to 41d may be installed at the outlet side of the use side heat exchangers 26a to 26d.

The flow amount meters 41a to 41d are adapted to detect the flow amount of the heat medium flowing through the use side heat exchangers 26a to 26d. For example, when the flow amount adjustment valves 25a to 25d are stepping-motor type flow amount adjustment valves, there is a correlation between the number of pulses for motor drive and the flow amount. Therefore, by storing the relation between the number of pulses and the flow amount in a storage device, the relay unit side controller 300 can detect the flow amount of the heat medium flowing through the use side heat exchangers 26a to 26d by estimation.

As mentioned above, according to the air-conditioning apparatus of Embodiment 2, since the relay unit side controller 300 (heat medium delivery control means 302) is adapted to calculate the heat amount needed in the use side heat exchangers 26a to 26d and the heat amount subjected to the heat exchange in the intermediate heat exchangers 15a and 15b, and to calculate the discharging flow amount of the pumps 21a and 21b such that the above two heat amounts become equal, and to control the rotation speed of the pumps 21a and 21b, it is possible to strike a right balance between need and demand of the heat amount. Therefore, useless carrying power in the pumps 21a and 21b can be reduced to enhance the effect of energy saving.

Embodiment 3

In the above-mentioned Embodiment 1, descriptions have been given using a pseudo-azeotropic mixture refrigerant as the refrigerant to circulate in the refrigeration cycle. However, it is not limited thereto. For example, a single refrigerant such as R-22 and R-134a, a pseudo-azeotropic mixture refrigerant such as R-407C, a refrigerant that is regarded to have a smaller global warming potential such as $CF_3CF=CH_2$ including a double bond in the chemical formula and its mixture, and a natural refrigerant such as $CO_2$ and propane may be employed.

In the air-conditioning apparatus according to the above-mentioned embodiment, the refrigeration cycle is configured to contain an accumulator 17. However, a configuration having no accumulator 17 is allowable. Since the check valves 13a to 13d are not indispensable means, the refrigeration cycle configured without them can perform the same operation and the same working effects can be achieved.

Although it is not shown in the above-mentioned embodiment in particular, for example, a fan may be provided in the outdoor unit 1 in order to promote heat exchange between the outside air and the refrigerant in the heat source side heat exchanger 12. In the indoor units 2a to 2d, a fan may be provided in order to promote heat exchange between the air and the heat medium in the use side heat exchangers 26a to 26d to deliver heated or cooled air into the indoor space 7, as well. In the above-mentioned embodiment, descriptions are given to providing a fan in order to promote heat exchange in the heat source side heat exchanger 12 and the use side heat exchanger 26a to 26d. However, it is not limited thereto. Any device is available as long as it is configured by means and apparatuses that can promote heat release or heat absorption for the refrigerant and heat medium. For example, the use side heat exchangers 26a to 26d can be configured by a panel heater utilizing radiation, and the like, without providing a fan in particular. The heat exchange with the refrigerant in the heat source side heat exchanger 12 may be performed by water and anti-freezing liquid.

In the above-mentioned embodiment, descriptions have been given to the case where four indoor units 2 have the use side heat exchanger 26a to 26d respectively. However, the number of the indoor unit 2 is not limited to four.

Although descriptions have been given to the case where the flow path switching valves 22a to 22d and 23a to 23d, the stop valves 24a to 24d, and the flow amount adjustment valves 25a to 25d are connected with respective use side heat exchangers 26a to 26d on a one-to-one basis, it is not limited thereto. For example, a plurality of each apparatus may be provided to each use side heat exchanger 26a to 26, to be operated in the same way. Then, the flow path switching valves 22 and 23, the stop valve 24, and the flow amount adjustment valves 25 connected with the same use side heat exchangers 26a to 26d may be operated in the same way.

In the above-mentioned embodiment, descriptions have been given to the example where one intermediate heat exchanger 15a for cooling the heat refrigerant as an evaporator and one intermediate heat exchanger 15b for heating the heat medium as a condenser are provided, respectively. The present invention does not limit the number of each unit as one, but a plurality of units can be provided.

Embodiment 4

Figure 11:
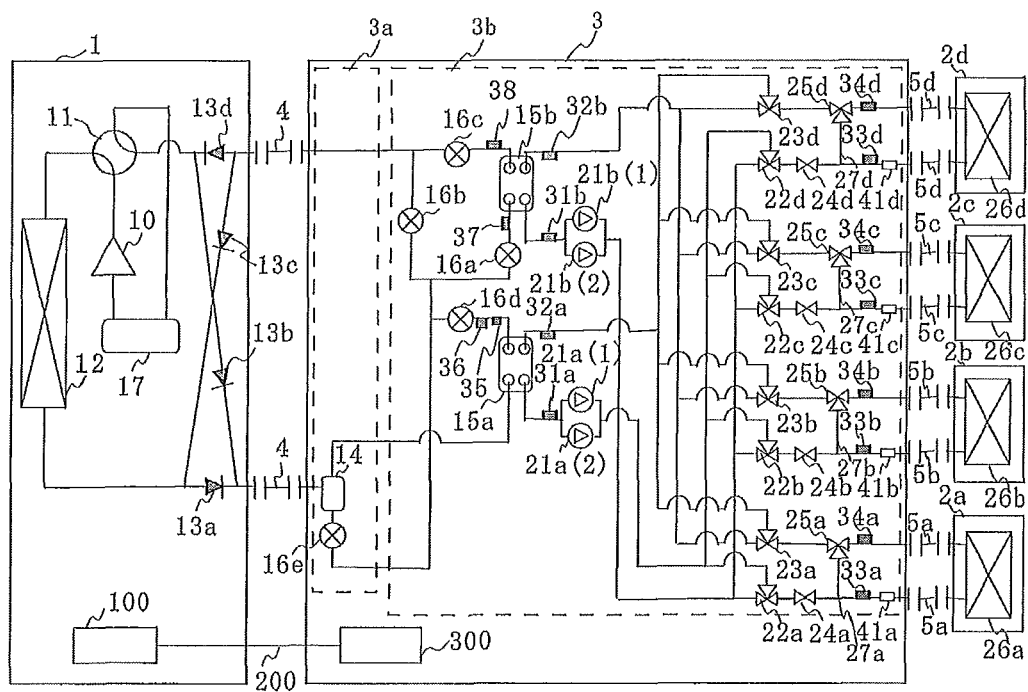
[FIG. 11]

FIG. 11 is a diagram showing the configuration of an air-conditioning apparatus according to Embodiment 4. In FIG. 11, pumps 21a (1) and 21a(2) are each an apparatus for delivering the heated heat medium like the pump 21a. Pumps 21b (1) and 21b(2) are each an apparatus for delivering the cooled heat medium as well.

In the above-mentioned embodiments, one unit of each of the pumps 21a and 21b for delivering the heated and cooled heat medium is provided to the heat medium circulation circuit respectively. As shown in FIG. 9, in place of, for example, pumps 21a and 21b, two or more small-capacity pumps 21a (1) and 21a(2) and pumps 21b(1) and 21b(2) may be arranged in parallel. By arranging two or more small-capacity pumps 21 in parallel, more meticulous control can be expected to be done. In the event of failure, other pump 21 can make up for the pump in trouble.

Embodiment 5

Figure 12:
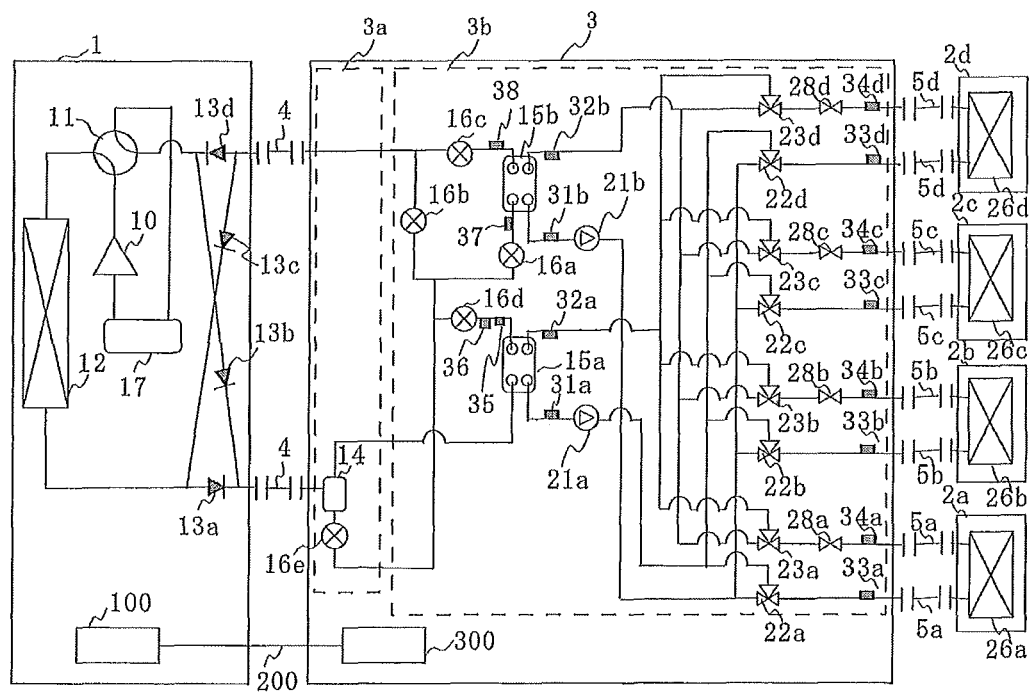
[FIG. 12]

FIG. 12 is a diagram showing the configuration of an air-conditioning apparatus according to Embodiment 5. In the air-conditioning apparatus of FIG. 12, in place of the flow amount adjustment valves 25a to 25d and the stop valves 24a to 24d, for example, the two-way flow amount adjustment valves 28a to 28d are employed, which are each an solenoid valve or a stepping-motor type flow amount adjustment valve. The two-way flow amount adjustment valves 28a to 28d adjust the flow amount of the heat medium flowing into/out of respective use side heat exchangers 26a to 26d based on the instructions from the heat medium heat exchanger side controller 101. Further, the flow path to each use side heat exchanger 26a to 26d is closed by making the opening-degree to be such that no refrigerant flows. By allowing the two-way flow amount adjustment valves 28a to 28d to combine the functions of the flow amount adjustment valves 25a to 25d and the stop valves 24a to 24d in Embodiment 1, it becomes possible to reduce the number of apparatuses (valves) to achieve a low cost configuration.

Here, not shown in particular in the above-mentioned embodiments, however, the two-way flow amount adjustment valves 28a to 28d or the three-way flow amount adjustment valves 25a to 25d, the third temperature sensors 33a to 33d, and the fourth temperature sensors 34a to 34d may be installed in the relay unit 3 or in the vicinity thereof. By installing them in the relay unit 3 having the flow path switching valves 22a to 22d or in the vicinity thereof, apparatuses and components related to heat medium circulation can be gathered at the locations close to each other. Accordingly, inspection, repair and the like can be easily done. On the other hand, they may be installed in the indoor units 2a to 2d in order to enhance controllability a configuration similar to an electronic expansion valve of a regular air-conditioning apparatus that precisely detects the temperature related to the use side heat exchangers 26a to 26d without being affected by the length of the heat medium pipeline 5.

The invention clamied is:

1. An air-conditioning apparatus comprising:
a refrigeration cycle circuit that connects a compressor that pressurizes a refrigerant, a refrigerant flow path switching apparatus that switches a circulation path of said refrigerant, a heat source side heat exchanger that makes said refrigerant exchange heat, a throttle apparatus that adjusts the pressure of said refrigerant, and two or more intermediate heat exchangers that exchange heat between said refrigerant and a heat medium different from said refrigerant, by piping; and
a heat medium circulation circuit that connects a pump that makes said heat medium related to the heat exchange of each intermediate heat exchanger of said two or more heat exchangers circulate, a plurality of use side heat exchangers that exchange heat between said heat medium and the air related to an air-conditioning space, and a plurality of flow path switching valves that select either of heated heat medium or cooled heat medium and make the selected one pass through pipelines connected with an inlet side and an outlet side of each of said use side heat exchangers, by piping, wherein
said pump comprises one or a plurality of first pumps for delivering heated heat medium and one or a plurality of second pumps for delivering cooled heat medium,
said heat medium circulation circuit is provided with:
a use side flow amount controller for adjusting the flow amount of said heat medium passing through each use side heat exchanger,
a plurality of first inlet heat medium temperature sensors for detecting the temperature of said heat medium flowing into each use side heat exchanger, respectively, and a plurality of first outlet heat medium temperature sensors for detecting the temperature of said heat medium having flowed out of each use side heat exchanger, respectively, and
a heat medium flow amount controller that calculates a temperature difference between said heat medium flowing into and out of each use side heat exchanger based on the temperatures related to the detection by said first inlet and outlet heat medium temperature sensors and makes said use side flow amount controller adjust the flow amount of said heat medium passing through each use side heat exchanger so that said temperature difference becomes a set target temperature value,
cooling and heating simultaneous operation is enabled by simultaneously performing heating of the heat medium by at least one of the intermediate heat exchangers and performing cooling of the heat medium by at least one other intermediate heat exchanger, transmitting the heat medium heated by said at least one intermediate heat exchanger to all of the use side heat exchangers used for heating air related to the air-conditioning space, and transmitting the heat medium cooled by said at least one other intermediate heat exchanger to all of the use side heat exchangers used for cooling air related to the air-conditioning space, wherein
the heat source side heat exchanger is disposed in an outdoor unit, the intermediate heat exchangers, the pumps and the flow path switching valves are disposed in a first enclosure, and form a relay unit,
the use side heat exchangers are disposed in at least one second enclosure that is different from said first enclosure and is associated with said air-conditioning space and form at least one indoor unit;
the outdoor unit is disposed in a space that is outside of said relay unit and said indoor unit, and is provided with a first controller for controlling the compressor,
the relay unit is provided with the heat medium flow amount controller and a second controller for controlling the pumps and the flow path switching valves, and the first and second controllers are connected by a signal line for communicating signals, and said first inlet heat medium temperature sensors and said first outlet heat medium temperature sensors are disposed in said first enclosure of said relay unit.

2. The air-conditioning apparatus of claim 1, wherein said heat medium circulation circuit is further provided with a heat medium bypass pipeline that connects an inlet side flow path and an outlet side flow path of the heat medium in each use side heat exchanger respectively, and said use side flow amount controller controls flow amounts of said heat medium passing through said heat medium bypass pipeline and each use side heat exchanger.

3. The air-conditioning apparatus of claim 1, wherein said use side flow amount controller is a two-way flow amount adjustment valve for adjusting the flow amount of said heat medium passing through said use side heat exchanger at an inlet side flow path or an outlet side flow path in said use side heat exchanger.

4. The air-conditioning apparatus of claim 1, further comprising:

a stop valve disposed in the flow path between one of said flow path switching valves and said use side heat exchanger, to supply or stop said heat medium to said use side heat exchanger.

5. The air-conditioning apparatus of claim 1, further comprising:

a second heat medium temperature sensor that detects the temperature of said heat medium flowing into or flowing out of each intermediate heat exchanger or the temperature of said heat medium flowing out of said pump, and a heat medium delivery controller that controls the flow amount of the heat medium that said pump delivers so as to make the temperature related to the detection by the second heat medium temperature sensor approach a set target temperature value.

6. The air-conditioning apparatus of claim 5, wherein said heat medium delivery controller sets said target temperature value based on the temperature of said refrigerant passing through each of said intermediate heat exchangers.

7. The air-conditioning apparatus of claim 1, further comprising:

a flow meter or a flow amount estimation detection portion that detects the flow amount of said heat medium flowing into and out of said use side heat exchanger, and a heat medium delivery controller that calculates capacity related to the heat exchange of said use side heat exchanger based on the flow amount detected by said flow meter or a flow amount estimation detection portion to control the flow amount of the heat medium that said pump delivers.

8. The air-conditioning apparatus of claim 1, comprising:

a heat medium delivery controller that judges the presence or absence of said use side heat exchanger in need of said heated heat medium to control drive or stop of said first pump, and judges the presence or absence of said use side heat exchanger in need of said cooled heat medium to control drive or stop of said second pump.

* * * * *